United States Patent
Pullagurla et al.

(10) Patent No.: US 12,546,623 B2
(45) Date of Patent: Feb. 10, 2026

(54) WORLD MODEL GENERATION AND CORRECTION FOR AUTONOMOUS VEHICLES

(71) Applicant: TORC Robotics, Inc., Blacksburg, VA (US)

(72) Inventors: Harish Pullagurla, Blacksburg, VA (US); Ryan Chilton, Blacksburg, VA (US); Harish Karunakaran, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 226 days.

(21) Appl. No.: 18/342,478

(22) Filed: Jun. 27, 2023

(65) Prior Publication Data

US 2025/0003764 A1     Jan. 2, 2025

(51) Int. Cl.
*G01C 21/00* (2006.01)
*B60W 40/06* (2012.01)

(52) U.S. Cl.
CPC ......... *G01C 21/3815* (2020.08); *B60W 40/06* (2013.01); *G01C 21/3848* (2020.08); *B60W 2420/403* (2013.01); *B60W 2420/408* (2024.01); *B60W 2556/40* (2020.02)

(58) Field of Classification Search
CPC ........... G01C 21/3815; G01C 21/3848; B60W 40/06; B60W 2420/403; B60W 2420/408; B60W 2556/40
USPC ......................................................... 701/409
See application file for complete search history.

(56) References Cited

U.S. PATENT DOCUMENTS

| | | | |
|---|---|---|---|
| 7,711,468 B1 | 5/2010 | Levy | |
| 10,528,055 B2 | 1/2020 | Kappauf et al. | |
| 10,565,887 B2 | 2/2020 | Cherepinsky et al. | |
| 10,591,914 B2 | 3/2020 | Palanisamy et al. | |
| 11,283,877 B2 * | 3/2022 | Kentley-Klay | B60Q 1/549 |
| 11,301,767 B2 * | 4/2022 | Levinson | G05D 1/0088 |
| 11,430,182 B1 | 8/2022 | Yang et al. | |
| 11,465,642 B2 * | 10/2022 | Xiao | B60W 60/001 |
| 11,644,834 B2 | 5/2023 | Ditty et al. | |
| 11,698,272 B2 | 7/2023 | Kroepfl et al. | |
| 11,733,703 B2 | 8/2023 | Anthony | |
| 11,989,019 B1 * | 5/2024 | Krishnaswamy | B60W 60/00 |
| 12,139,165 B2 * | 11/2024 | Zhao | G05D 1/0295 |
| 12,235,121 B2 * | 2/2025 | Rasmusson | G05D 1/227 |
| 12,381,950 B2 * | 8/2025 | Tran | G01S 13/931 |
| 2019/0258251 A1 | 8/2019 | Ditty et al. | |

(Continued)

*Primary Examiner* — Andrew Joseph Rudy
(74) *Attorney, Agent, or Firm* — Armstrong Teasdale LLP

(57) ABSTRACT

Systems and methods of generating and updating a world model for autonomous vehicle navigation are disclosed. An autonomous vehicle system can receive sensor data from a plurality of sensors of an autonomous vehicle, where the sensor data is captured during operation of the autonomous vehicle; access a world model generated based at least on map information corresponding to a location of the operation of the autonomous vehicle; determine at least one semantic correction for the world model based on the sensor data; determine at least one geometric correction for the world model based on the sensor data and the map information; and generate an updated world model based on the at least one semantic correction and the at least one geometric correction.

20 Claims, 7 Drawing Sheets

(56) References Cited

U.S. PATENT DOCUMENTS

| | | |
|---|---|---|
| 2023/0288223 A1 | 9/2023 | Shekar et al. |
| 2023/0366699 A1 | 11/2023 | Bande et al. |
| 2024/0083456 A1 | 3/2024 | Huang et al. |
| 2024/0304003 A1 | 9/2024 | Elluswamy et al. |
| 2024/0375678 A1* | 11/2024 | Xu .................... G01C 21/3691 |
| 2024/0416949 A1* | 12/2024 | Barrera ................ B60W 30/16 |

* cited by examiner

WORLD MODEL GENERATION AND CORRECTION FOR AUTONOMOUS VEHICLES

TECHNICAL FIELD

The present disclosure relates to autonomous vehicles and, more specifically, to generating and correcting world models for autonomous vehicle operation.

BACKGROUND

The use of autonomous vehicles has become increasingly prevalent in recent years, with the potential for numerous benefits. One challenge faced by autonomous vehicles is modeling the surroundings of the autonomous vehicle. Conventional approaches utilize static, pre-processed map data to provide semantic, geometric, and other features of maps for navigating autonomous vehicles.

However, static, pre-processed map data may be incorrect, for example, when features of a road change over time. In such circumstances, the map data that the autonomous vehicle utilizes for navigation may not match the physical characteristics of the road, introducing public safety issues, a potential to violate certain traffic regions, and an increased risk of damage to the autonomous vehicle.

SUMMARY

The systems and methods of the present disclosure may solve the problems set forth above and/or other problems in the art. The scope of the current disclosure, however, is defined by the attached claims, and not by the ability to solve any specific problem.

Disclosed herein are techniques to generate and correct a world model for an autonomous vehicle based on real-time or near real-time sensor data and static, pre-processed map data. Rather than solely utilizing static, pre-processed map data for navigation, the systems and methods described herein provide techniques to generate a model (e.g., may be referred to as a "world model") that represents navigation-relevant features of the environment surrounding an autonomous vehicle.

The world model may be generated based on high-definition map data. When operating on a roadway, the autonomous vehicle can gather and process sensor data to generate both semantic and geometric corrections to the features of the world model. These corrections can be applied to the world model in real-time or near real-time, and the corrected world model can be provided to downstream navigation components executed by the autonomous vehicle. Additional, temporal features may be incorporated into the world model, such as the state of traffic signals, road conditions, and navigation control data.

One embodiment of the present disclosure is directed to a system. The system includes at least one processor coupled to non-transitory memory. The system can receive sensor data from a plurality of sensors of an autonomous vehicle, the sensor data captured during operation of the autonomous vehicle; access a world model generated based at least on map information corresponding to a location of the operation of the autonomous vehicle; determine at least one semantic correction for the world model based on the sensor data; determine at least one geometric correction for the world model based on the sensor data and the map information; and generate an updated world model based on the at least one semantic correction and the at least one geometric correction.

The system may generate the updated world model further based on a road condition detected via the sensor data. The system may generate the updated world model further based on a state of a dynamic traffic signal detected via the sensor data. The at least one semantic correction may comprise a change to signage identified in the world model. The at least one geometric correction may comprise a change in lane geometry identified in the world model.

The plurality of sensors may comprise one or more of a light detection and ranging (LiDAR) sensor, a radar sensor, a camera, or an inertial measurement unit (IMU). The world model may comprise road structure information identifying one or more of a grade of a road, an elevation of the road, or a surface type of the road. The world model may comprise road marking information identifying one or more of a lane line location of a lane in a road, a lane type of the lane in the road, or a shoulder location of the road.

The system may determine the at least one semantic correction based on a comparison between (i) an object detected from the sensor data and (ii) corresponding information in the world model. The system may determine the at least one geometric correction based on a comparison of a geometry of a road detected via the sensor data and a corresponding geometry of the road identified in the map information of the world model.

One other aspect is directed to a method. The method includes receiving sensor data from a plurality of sensors of an autonomous vehicle, the sensor data captured during operation of the autonomous vehicle; accessing a world model generated based at least on map information corresponding to a location of the operation of the autonomous vehicle; determining at least one semantic correction for the world model based on the sensor data; determining at least one geometric correction for the world model based on the sensor data and the map information; and generating an updated world model based on the at least one semantic correction and the at least one geometric correction.

The method may include generating the updated world model further based on a road condition detected via the sensor data. The method may include generating the updated world model further based on a state of a dynamic traffic signal detected via the sensor data. The at least one semantic correction may comprise a change to signage identified in the world model. The at least one geometric correction may comprise a change in lane geometry identified in the world model. The plurality of sensors may comprise one or more of a LiDAR sensor, a radar sensor, a camera, or an IMU.

The world model may comprise road structure information identifying one or more of a grade of a road, an elevation of the road, or a surface type of the road. The world model may comprise road marking information identifying one or more of a lane line location of a lane in a road, a lane type of the lane in the road, or a shoulder location of the road. The method may include determining the at least one semantic correction based on a comparison between (i) an object detected from the sensor data and (ii) corresponding information in the world model. The method may include determining the at least one geometric correction based on a comparison of a geometry of a road detected via the sensor data and a corresponding geometry of the road identified in the map information of the world model.

One other aspect is directed to another system. The system includes at least one processor coupled to non-transitory memory. The system can retrieve, from a world model, expected geometric data for a road traveled by an autonomous vehicle; receive sensor data from a plurality of sensors of the autonomous vehicle, the sensor data captured during operation of the autonomous vehicle; generate a predicted geometry for a feature of the road; detect an error in the expected geometric data based on the predicted geometry of the feature; and generate a correction to the world model based on the error.

The system may execute an artificial intelligence model using at least a portion of the sensor data as input to generate the predicted geometry for the feature of the road. The feature of the road may comprise one or more of a shoulder of the road, a lane of the road, or an intersection of the road. The expected geometric data for the road may comprise one or more of a location of a shoulder of the road, a location of one or more lane lines of the road, or a number of lanes of the road. The plurality of sensors comprises one or more of a LiDAR sensor, a radar sensor, a camera, or an IMU.

The system may transmit the correction to at least one server to correct corresponding map information. The system may detect the error responsive to a difference between the predicted geometry for the feature and expected geometric of the feature indicated in the expected geometric data satisfying a threshold. The system may modify the world model based on the correction; and navigate the autonomous vehicle based at least in part on the modified world model.

One other aspect is directed to another method. The method includes retrieving, from a world model, expected geometric data for a road traveled by an autonomous vehicle; receiving sensor data from a plurality of sensors of the autonomous vehicle, the sensor data captured during operation of the autonomous vehicle; generating a predicted geometry for a feature of the road; detecting an error in the expected geometric data based on the predicted geometry of the feature; and generating a correction to the world model based on the error.

The method may include executing an artificial intelligence model using at least a portion of the sensor data as input to generate the predicted geometry for the feature of the road. The feature of the road may comprise one or more of a shoulder of the road, a lane of the road, or an intersection of the road. The expected geometric data for the road may comprise one or more of a location of a shoulder of the road, a location of one or more lane lines of the road, or a number of lanes of the road. The plurality of sensors may comprise one or more of a LiDAR sensor, a radar sensor, a camera, or an IMU.

The method may include transmitting the correction to at least one server to correct corresponding map information. The method may include detecting the error responsive to a difference between the predicted geometry for the feature and expected geometric of the feature indicated in the expected geometric data satisfying a threshold. The method may include modifying the world model based on the correction; and navigating the autonomous vehicle based at least in part on the modified world model.

One other aspect is directed to an autonomous vehicle. The autonomous vehicle includes a plurality of sensors; and at least one processor coupled to non-transitory memory. The autonomous vehicle can receive, during operation of the autonomous vehicle, sensor data from the plurality of sensors; autonomous vehicle determine, based on the sensor data, a predicted geometry of a feature of a road traveled by the autonomous vehicle; detect, based on the sensor data and the predicted geometry of the feature, an error in expected geometric data of a world model used in navigation of the autonomous vehicle; generate an updated world model based on the error; and navigate the autonomous vehicle based at least in part on the updated world model.

The autonomous vehicle may execute an artificial intelligence model using at least a portion of the sensor data as input to generate the predicted geometry for the feature of the road as output. The plurality of sensors comprises one or more of a LiDAR sensor, a radar sensor, a camera, or an IMU. The expected geometric data for the road may comprise one or more of a location of a shoulder of the road, a location of one or more lane lines of the road, or a number of lanes of the road.

One other aspect is directed to yet another system. The system includes at least one processor coupled to non-transitory memory. The system can retrieve, from a world model, expected semantic data for a road traveled by an autonomous vehicle; receive sensor data from a plurality of sensors of the autonomous vehicle, the sensor data captured during operation of the autonomous vehicle; detect an error in the expected semantic data based on the sensor data; and generate a correction to the world model based on the error.

The system may modify a speed limit identified in the world model based on the correction. The system may navigate the autonomous vehicle based at least in part on the modified world model. The plurality of sensors may comprise one or more of a light detection and ranging (LiDAR) sensor, a radar sensor, a camera, or an inertial measurement unit (IMU). The expected semantic data may comprise one or more of a speed limit for the road, a lane type of a lane of the road, a presence of a road sign corresponding of the road, or a type of the road sign.

The system may transmit the correction to at least one server to correct corresponding map information. The system may detect, based on the sensor data, one or more objects corresponding to the road traveled by the autonomous vehicle; and generate additional semantic data for the road based on a classification of the one or more objects. The system may generate the correction based on the additional semantic data.

One other aspect is directed to yet another method. The method includes retrieving, from a world model, expected semantic data for a road traveled by an autonomous vehicle; receiving sensor data from a plurality of sensors of the autonomous vehicle, the sensor data captured during operation of the autonomous vehicle; detecting an error in the expected semantic data based on the sensor data; and generating a correction to the world model based on the error.

The method may include modifying a speed limit identified in the world model based on the correction. The method may include navigating the autonomous vehicle based at least in part on the modified world model. The plurality of sensors may comprise one or more of a LiDAR sensor, a radar sensor, a camera, or an IMU. The expected semantic data may comprise one or more of a speed limit for the road, a lane type of a lane of the road, a presence of a road sign corresponding of the road, or a type of the road sign. The method may include transmitting the correction to at least one server to correct corresponding map information.

The method may include detecting, based on the sensor data, one or more objects corresponding to the road traveled by the autonomous vehicle; and generating, by the at least one processor, additional semantic data for the road based on a classification of the one or more objects. The method may include generating the correction based on a comparison of the additional semantic data and the expected semantic data retrieved from the world model.

One other aspect is directed to another autonomous vehicle. The autonomous vehicle includes a plurality of sensors; and at least one processor coupled to non-transitory memory. The autonomous vehicle can receive, during operation of the autonomous vehicle, sensor data from the plurality of sensors; detect, based on the sensor data, an error in expected semantic data of a world model used in navigation of the autonomous vehicle; generate an updated world model based on the error; and navigate the autonomous vehicle based at least in part on the updated world model.

The plurality of sensors may comprise one or more of a LiDAR sensor, a radar sensor, a camera, or an IMU. The autonomous vehicle may detect, based on the sensor data, one or more objects corresponding to a road traveled by the autonomous vehicle; and generate additional semantic data for the road based on a classification of the one or more objects. The autonomous vehicle may detect the error based on a mismatch between the expected semantic data of the world model and the additional semantic data.

BRIEF DESCRIPTION OF THE DRAWINGS

The accompanying drawings, which are incorporated in and constitute a part of this specification, illustrate various exemplary embodiments and, together with the description, serve to explain the principles of the disclosed embodiments.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting, and it may be readily understood that certain aspects of the disclosed systems and methods can be variously arranged and combined, all of which arrangements and combinations are contemplated by this disclosure.

Figure 1:
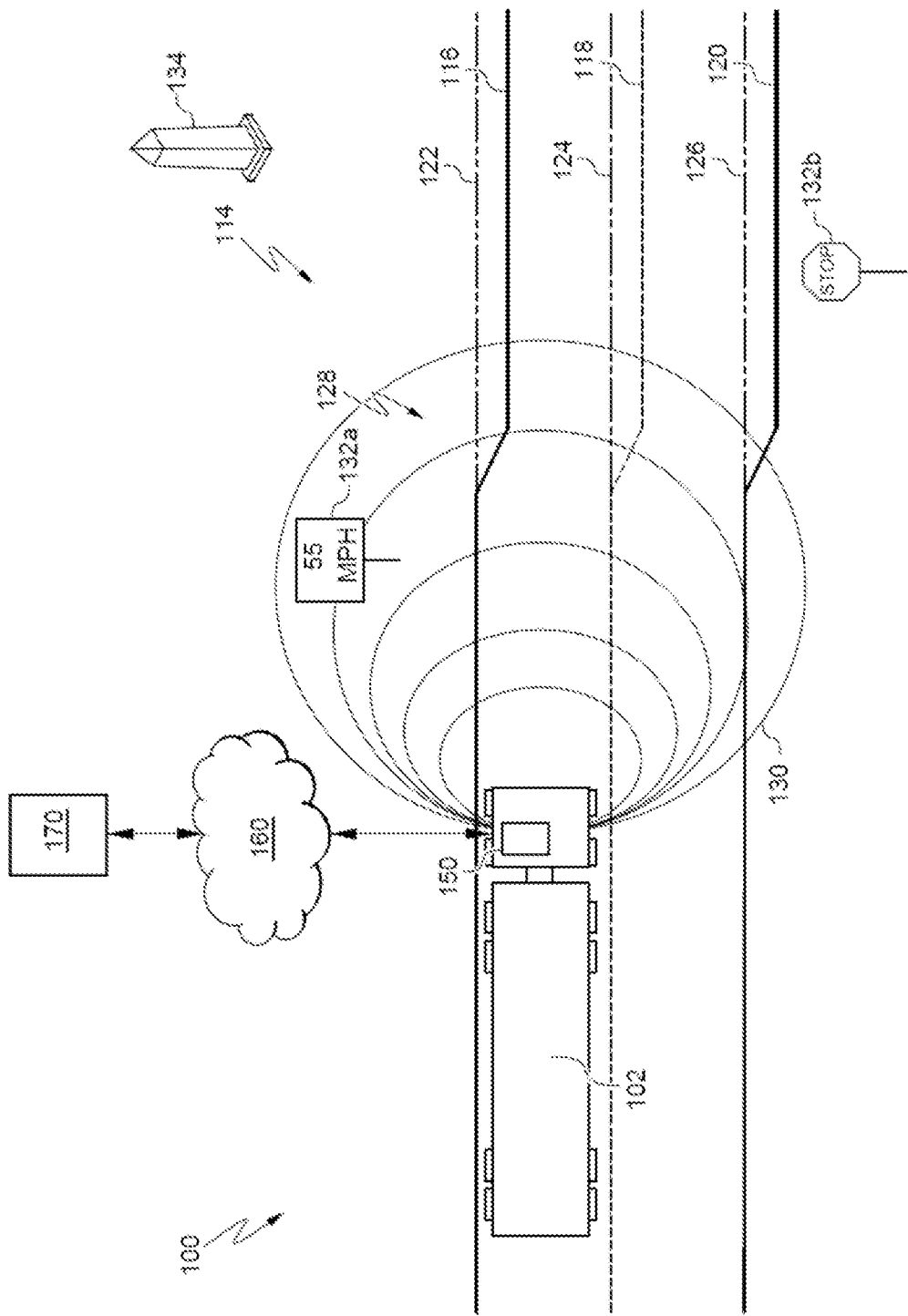
FIG. 1 is a bird's eye view of a roadway including a schematic representation of a vehicle and aspects of an autonomy system of the vehicle, according to an embodiment.

Referring to FIG. 1, the present disclosure relates to autonomous vehicles, such as an autonomous truck 102 having an autonomy system 150. The autonomy system 150 of truck 102 may be completely autonomous (fully autonomous), such as self-driving, driverless, or Level 4 autonomy, or semi-autonomous, such as Level 3 autonomy. As used herein the term "autonomous" includes both fully autonomous and semi-autonomous. The present disclosure sometimes refers to autonomous vehicles as ego vehicles. The autonomy system 150 may be structured on at least three aspects of technology: (1) perception, (2) localization, and (3) planning/control. The function of the perception aspect is to sense an environment surrounding truck 102 and interpret it. To interpret the surrounding environment, a perception module or engine in the autonomy system 150 of the truck 102 may identify and classify objects or groups of objects in the environment. For example, a perception module associated with various sensors (e.g., LiDAR, camera, radar, etc.) of the autonomy system 150 may identify one or more objects (e.g., pedestrians, vehicles, debris, signs, etc.) and features of the road (e.g., lane lines, shoulder lines, geometries of road features, lane types, etc.) around truck 102, and classify the objects in the road distinctly.

The localization aspect of the autonomy system 150 may be configured to determine where on a pre-established digital map the truck 102 is currently located. One way to do this is to sense the environment surrounding the truck 102 (e.g., via the perception system) and to correlate features of the sensed environment with details (e.g., digital representations of the features of the sensed environment) on the digital map. The digital map may be included as part of the world model, which the truck 102 utilizes to navigate, as described in further detail herein. In some implementations, map data corresponding to the location of the truck 102 may be included in the world model. For example, map data corresponding to a predetermined radius around, or a predetermined region in front of, the truck 102 may be included in the world model. As the truck 102 navigates a road, the world model may be updated to replace previous map data with map data that is proximate to the truck 102.

Once the systems on the truck 102 have determined its location with respect to the digital map features (e.g., location on the roadway, upcoming intersections, road signs, etc.), and the world model has been generated, corrected, or otherwise updated, the truck 102 can plan and execute maneuvers and/or routes with respect to the features of the world model. The planning/control aspects of the autonomy system 150 may be configured to make decisions about how the truck 102 should move through the environment to get to its goal or destination. It may consume information from the perception and localization modules to know where it is relative to the surrounding environment and what other objects and traffic actors are doing.

FIG. 1 further illustrates an environment 100 for modifying one or more actions of truck 102 using the autonomy system 150. The truck 102 is capable of communicatively coupling to a remote server 170 via a network 160. The truck 102 may not necessarily connect with the network 160 or server 170 while it is in operation (e.g., driving down the roadway). That is, the server 170 may be remote from the vehicle, and the truck 102 may deploy with all the necessary perception, localization, and vehicle control software and data necessary to complete its mission fully-autonomously or semi-autonomously.

While this disclosure refers to a truck (e.g., a tractor trailer) 102 as the autonomous vehicle, it is understood that the truck 102 could be any type of vehicle including an automobile, a mobile industrial machine, etc. While the disclosure will discuss a self-driving or driverless autonomous system, it is understood that the autonomous system could alternatively be semi-autonomous, having varying degrees of autonomy or autonomous functionality.

Figure 2:
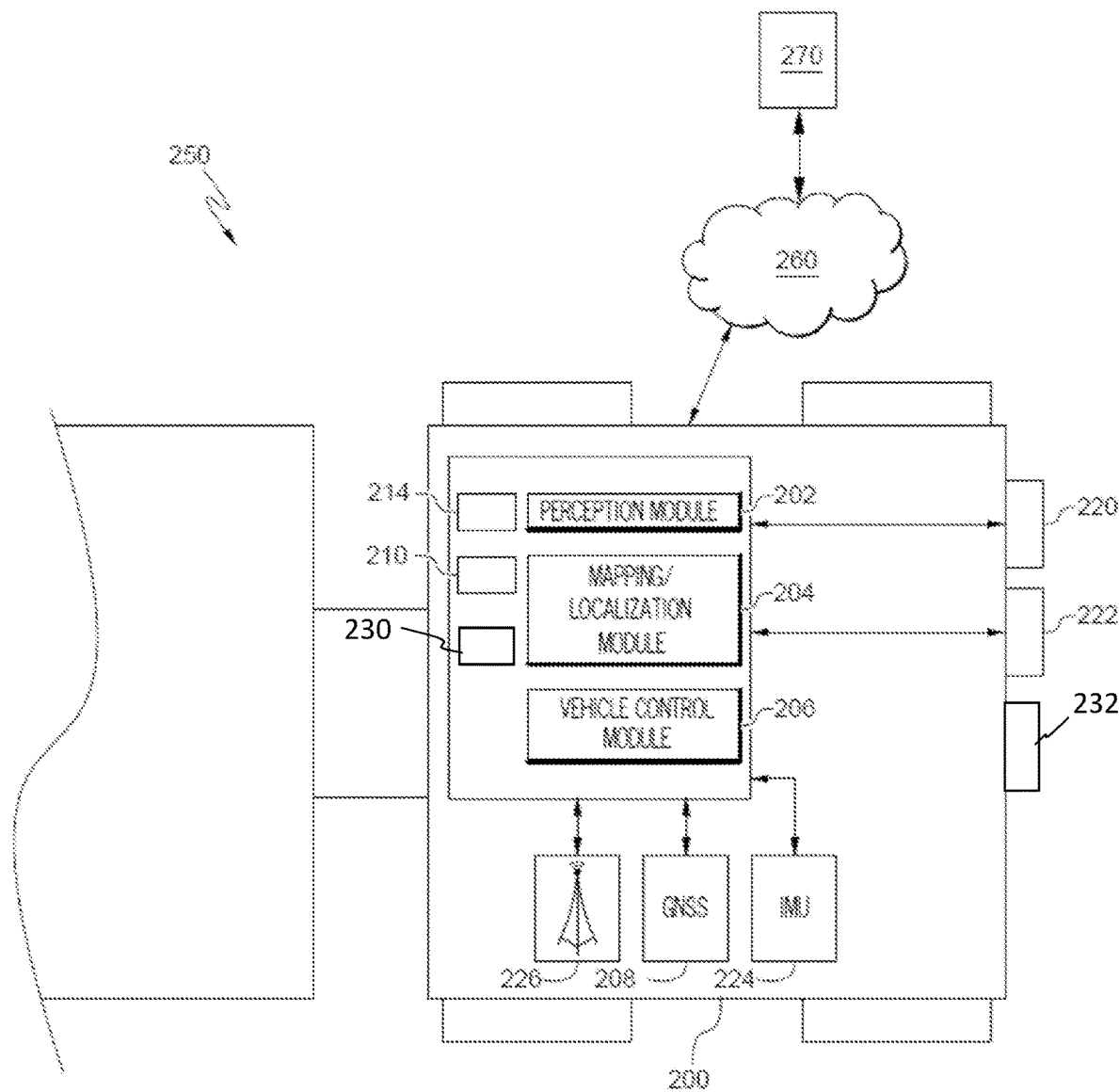
FIG. 2 is a schematic of the autonomy system of the vehicle, according to an embodiment.

With reference to FIG. 2, an autonomy system 250 of a truck 200 (e.g., which may be similar to the truck 102 of FIG. 1) may include a perception system including a camera system 220, a LiDAR system 222, a radar system 232, a GNSS receiver 208, an inertial IMU 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in many ways. As shown in FIG. 1, the perception systems aboard the autonomous vehicle may help the truck 102 perceive its environment out to a perception radius 130. The actions of the truck 102 may depend on the extent of perception radius 130.

The camera system 220 of the perception system may include one or more cameras mounted at any location on the truck 102, which may be configured to capture images of the environment surrounding the truck 102 in any aspect or field of view (FOV). The FOV can have any angle or aspect such that images of the areas ahead of, to the side, and behind the truck 102 may be captured. In some embodiments, the FOV may be limited to particular areas around the truck 102 (e.g., ahead of the truck 102) or may surround 360 degrees of the truck 102. In some embodiments, the image data generated by the camera system(s) 220 may be sent to the perception module 202 and stored, for example, in memory 214.

The LiDAR system 222 may include a laser generator and a detector and can send and receive laser rangefinding. The individual laser points can be emitted to and received from any direction such that LiDAR point clouds (or "LiDAR images") of the areas ahead of, to the side, and behind the truck 200 can be captured and stored. In some embodiments, the truck 200 may include multiple LiDAR systems, and point cloud data from the multiple systems may be stitched together. In some embodiments, the system inputs from the camera system 220 and the LiDAR system 222 may be fused (e.g., in the perception module 202). The LiDAR system 222 may include one or more actuators to modify a position and/or orientation of the LiDAR system 222 or components thereof. The LIDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud, and the point cloud may be rendered to visualize the environment surrounding the truck 200 (or object(s) therein). In some embodiments, the point cloud may be rendered as one or more polygon(s) or mesh model(s) through, for example, surface reconstruction. Collectively, the LiDAR system 222 and the camera system 220 may be referred to herein as "imaging systems."

The radar system 232 may estimate strength or effective mass of an object, as objects made of paper or plastic may be weakly detected. The radar system 232 may be based on 24 GHz, 77 GHz, or other frequency radio waves. The radar system 232 may include short-range radar (SRR), mid-range radar (MRR), or long-range radar (LRR). One or more sensors may emit radio waves, and a processor can process the received reflected data (e.g., raw radar sensor data).

The GNSS receiver 208 may be positioned on the truck 200 and may be configured to determine a location of the truck 200 via GNSS data, as described herein. The GNSS receiver 208 may be configured to receive one or more signals from a global navigation satellite system (GNSS) (e.g., global positioning system (GPS), etc.) to localize the truck 200 via geolocation. The GNSS receiver 208 may provide an input to and otherwise communicate with mapping/localization module 204 to, for example, provide location data for use with one or more digital maps, such as an HD map (e.g., in a vector layer, in a raster layer or other semantic map, etc.). In some embodiments, the GNSS receiver 208 may be configured to receive updates from an external network.

The IMU 224 may be an electronic device that measures and reports one or more features regarding the motion of the truck 200. For example, the IMU 224 may measure a velocity, an acceleration, an angular rate, and/or an orientation of the truck 200 or one or more of its individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204, to help determine a real-time location of the truck 200 and predict a location of the truck 200 even when the GNSS receiver 208 cannot receive satellite signals.

The transceiver 226 may be configured to communicate with one or more external networks 260 via, for example, a wired or wireless connection to send and receive information (e.g., to a remote server 270). The wireless connection may be a wireless communication signal (e.g., Wi-Fi, cellular, LTE, 5G, etc.) In some embodiments, the transceiver 226 may be configured to communicate with external network(s) via a wired connection, such as, for example, during initial installation, testing, or service of the autonomy system 250 of the truck 200. A wired/wireless connection may be used to download and install various lines of code in the form of digital files (e.g., HD digital maps), executable programs (e.g., navigation programs), and other computer-readable code that may be used by the system 250 to navigate the truck 200 or otherwise operate the truck 200, either fully-autonomously or semi-autonomously. The digital files, executable programs, and other computer readable code may be stored locally or remotely and may be routinely updated (e.g., automatically or manually) via the transceiver 226 or updated on demand.

In some embodiments, the truck 200 may not be in constant communication with the network 260, and updates which would otherwise be sent from the network 260 to the truck 200 may be stored at the network 260 until such time as the network connection is restored. In some embodiments, the truck 200 may deploy with all the data and software it needs to complete a mission (e.g., necessary perception, localization, and mission planning data) and may not utilize any connection to network 260 during some or the entire mission. Additionally, the truck 200 may send updates to the network 260 (e.g., regarding unknown or newly detected features in the environment as detected by perception systems) using the transceiver 226. For example, when the truck 200 detects differences between the perceived environment and the features on a digital map, the truck 200 may provide updates to the network 260 with information, as described in greater detail herein.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. Autonomy system 250 may include a single microprocessor or multiple microprocessors that may include means for identifying and reacting to differences between features in the perceived environment and features of the maps stored on the truck. Numerous commercially available microprocessors can be configured to perform the functions of the autonomy system 250. It should be appreciated that the autonomy system 250 could include a general machine controller capable of controlling numerous other machine functions. Alternatively, a special-purpose machine controller could be provided. Further, the autonomy system 250, or portions thereof, may be located remotely from the system 250. For example, one or more features of the mapping/localization module 204 could be located remotely from the truck. Various other known circuits may be associated with the autonomy system 250, including signal-conditioning circuitry, communication circuitry, actuation circuitry, and other appropriate circuitry.

Figure 3:
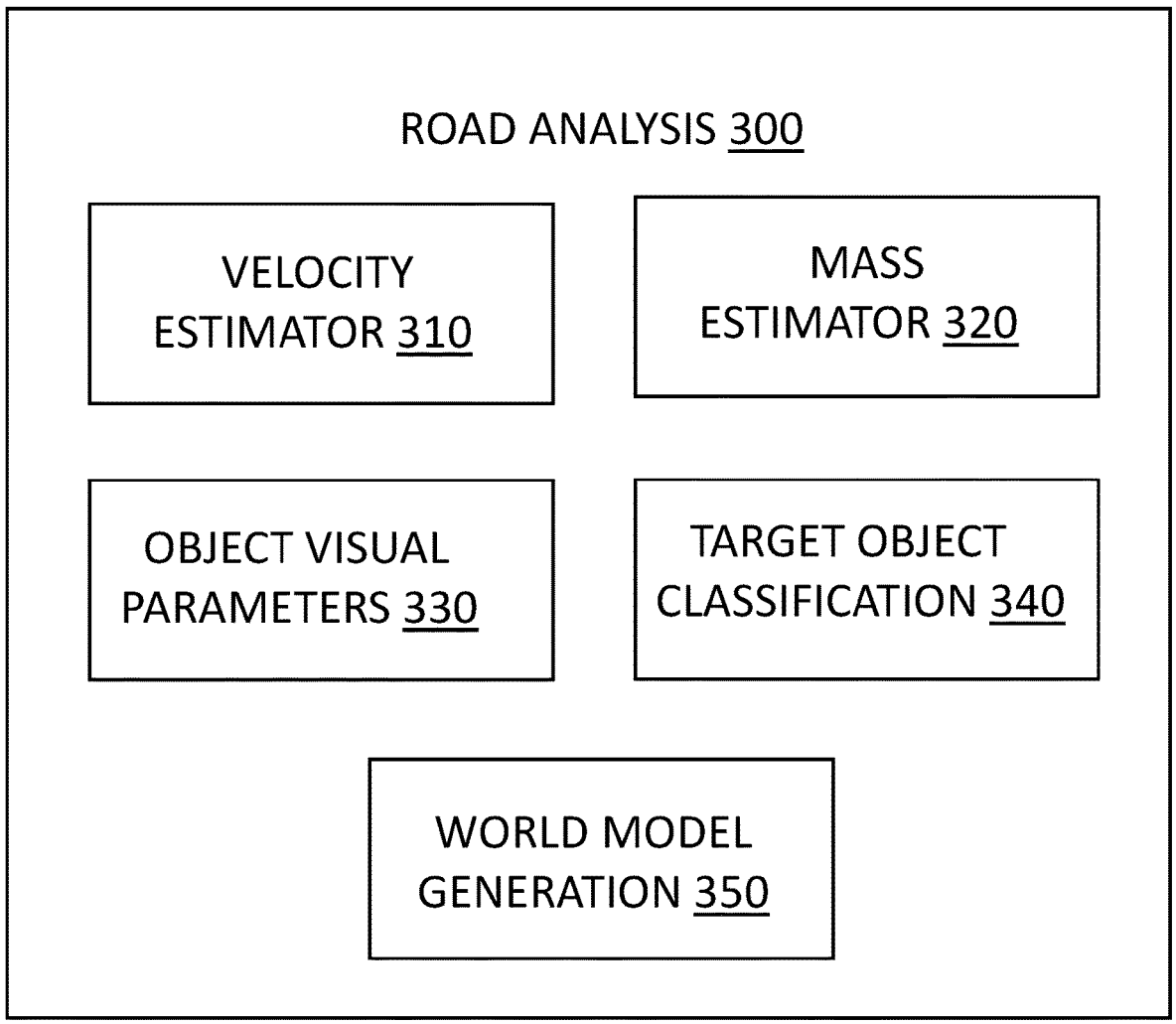
FIG. 3 is a schematic diagram of a road analysis module of the autonomy system of an autonomous vehicle, according to an embodiment.
Figure 4:
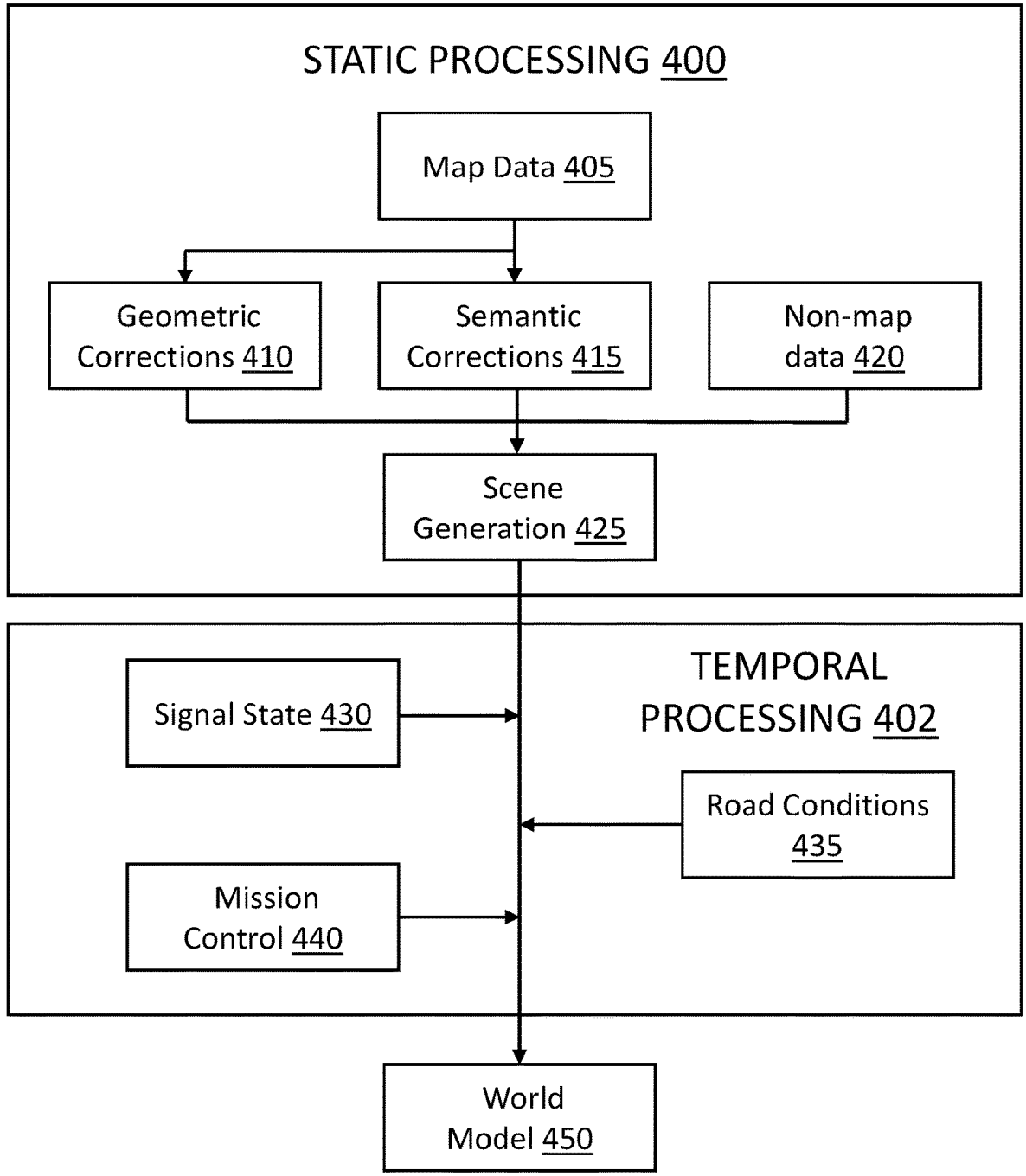
FIG. 4 is a data flow diagram showing processes for generating a world model for navigating an autonomous vehicle, according to an embodiment.
Figure 5:
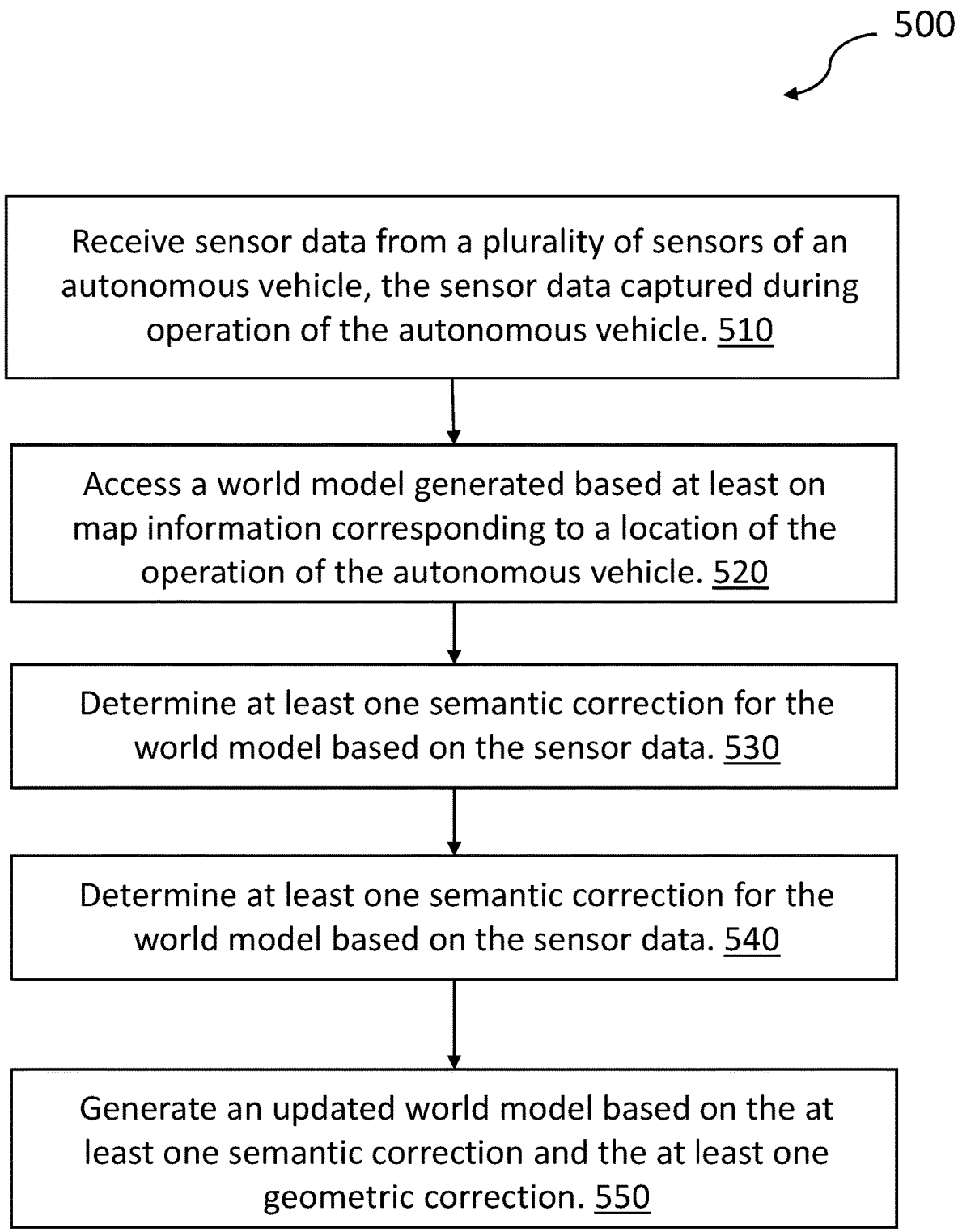
FIG. 5 is a flow diagram of an example method of generating and updating a world model for autonomous vehicle navigation, according to an embodiment.
Figure 6:
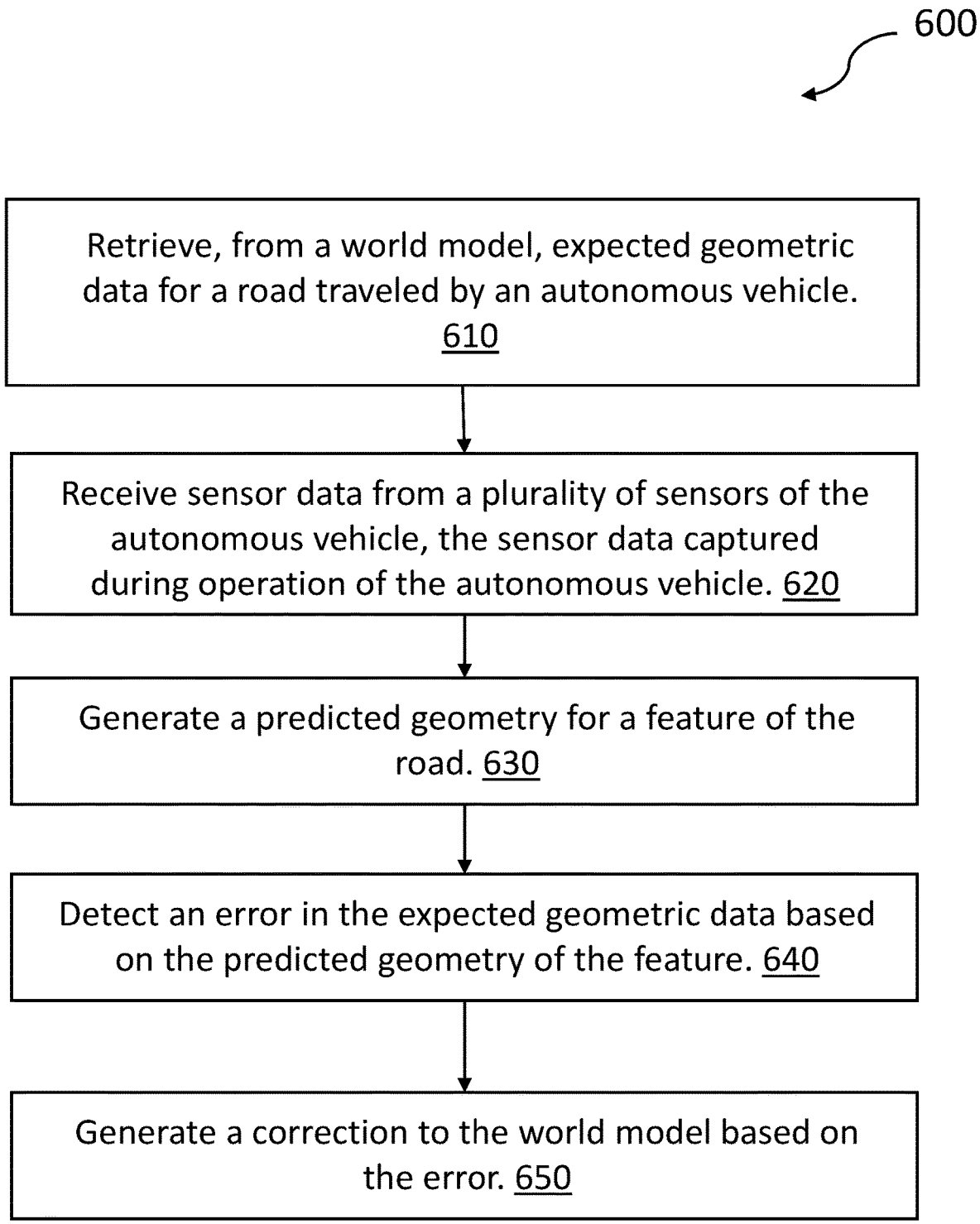
FIG. 6 is a flow diagram of an example method of generating geometric corrections for a world model for autonomous vehicle navigation, according to an embodiment.
Figure 7:
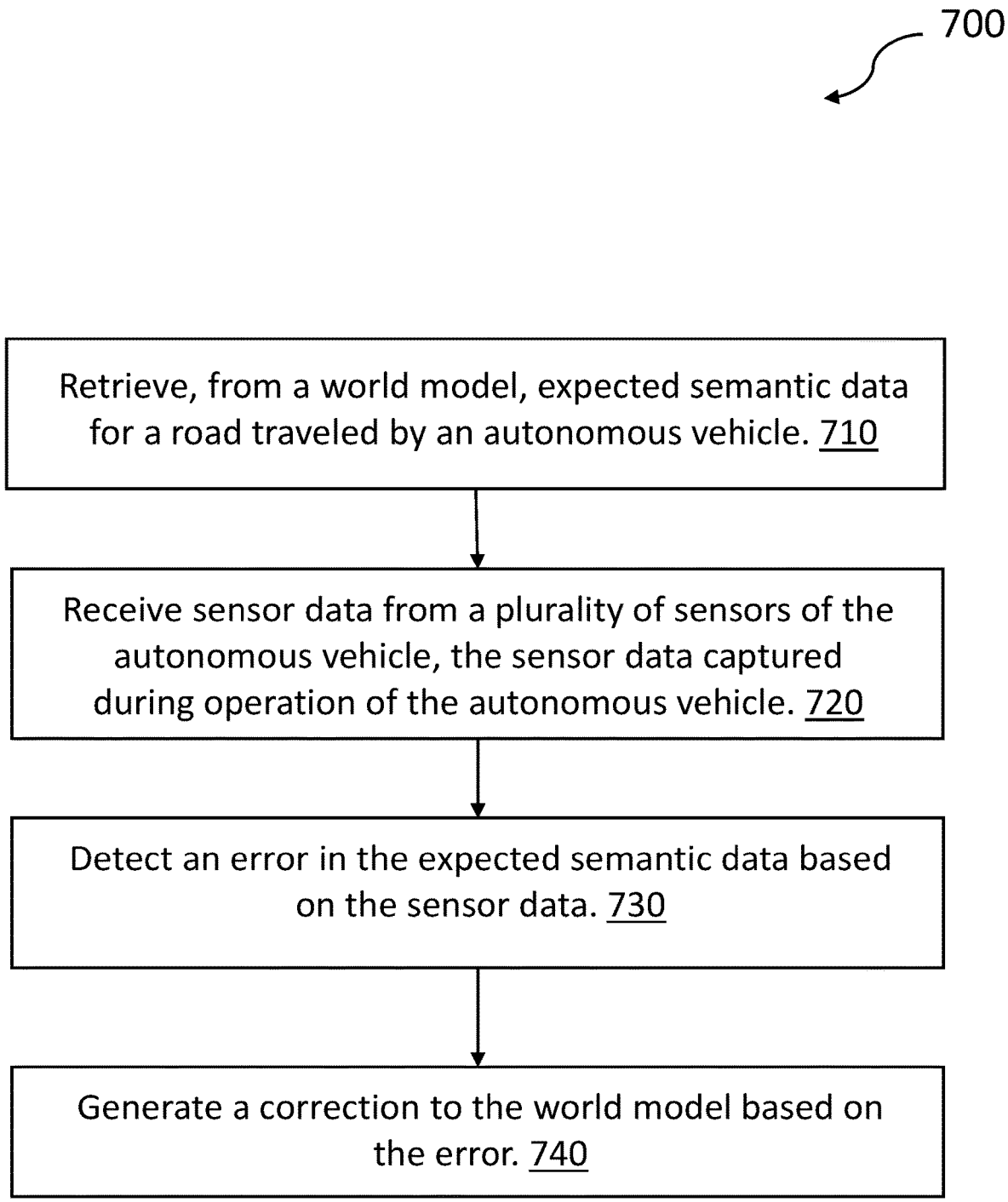
FIG. 7 is a flow diagram of an example method of generating semantic corrections for a world model for autonomous vehicle navigation, according to an embodiment.

The memory 214 of autonomy system 250 may store data and/or software routines that may assist the autonomy system 250 in performing its functions, such as the functions of the perception module 202, the localization module 204, the vehicle control module 206, a road analysis module 300 of FIG. 3, the static world model processing module 400 and the temporal world model processing module 402 of FIG. 4, and the method 500 of FIG. 5, the method 600 of FIG. 6, and method 700 of FIG. 7. The memory 214 may store one or more any data described herein relating to a world model, which may be generated based data (e.g., sensor data) captured via various components of the autonomous vehicle (e.g., the perception module 202, the mapping/localization module 204, the vehicle control module 206, the processor 210, etc.). Further, the memory 214 may also store data received from various inputs associated with the autonomy system 250, such as perception data from the perception system.

As noted above, perception module 202 may receive input from the various sensors, such as camera system 220, LiDAR system 222, GNSS receiver 208, and/or IMU 224, (collectively "perception data") to sense an environment surrounding the truck and interpret it. To interpret the surrounding environment, the perception module 202 (or "perception engine") may identify and classify objects or groups of objects in the environment. For example, the truck 200 may use the perception module 202 to identify one or more objects (e.g., pedestrians, vehicles, debris, road signs, etc.) or features of the roadway 114 (e.g., intersections, lane lines, shoulder lines, geometries of road features, lane types, etc.) before or beside a vehicle and classify the objects in the road. In some embodiments, the perception module 202 may include an image classification function and/or a computer vision function.

The system 150 may collect perception data. The perception data may represent the perceived environment surrounding the vehicle and may be collected using aspects of the perception system described herein. The perception data can come from, for example, one or more of the LiDAR systems, the camera system, and various other externally facing sensors and systems on board the vehicle (e.g., the GNSS receiver, etc.). For example, on vehicles having a sonar or radar system, the sonar and/or radar systems may collect perception data. As the truck 102 travels along the roadway 114, the system 150 may continually receive data from the various systems on the truck 102. In some embodiments, the system 150 may receive data periodically and/or continuously.

With respect to FIG. 1, the truck 102 may collect perception data that indicates presence of the lane lines 116, 118, 120. The perception data may indicate the presence of a line defining a shoulder of the road. Features perceived by the vehicle should track with one or more features stored in a digital map (e.g., in the localization module 204) of a world model, as described herein. Indeed, with respect to FIG. 1, the lane lines that are detected before the truck 102 is capable of detecting the bend 128 in the road (that is, the lane lines that are detected and correlated with a known, mapped feature) will generally match with features in the stored map of the world model and the vehicle will continue to operate in a normal fashion (e.g., driving forward in the left lane of the roadway or per other local road rules). However, in the depicted scenario, the vehicle approaches a new bend 128 in the road that is not stored in the world model (or inconsistent with the map data of the world model) because the lane lines 116, 118, 120 have shifted right from their original positions 122, 124, 126.

The system 150 may compare the collected perception data with the stored world model data to identify errors (e.g., geometric errors or semantic errors) in the stored world model. The example above, in which lanes lines have shifted from an expected geometry to a new geometry, is an example of a geometric error of the world model. To identify errors in the world model, the system may identify and classify various features detected in the collected perception data from the environment with the features stored in the data of the world model, including digital map data representing features proximate to the truck 102. For example, the detection systems may detect the lane lines 116, 118, 120 and may compare the geometry of detected lane lines with a corresponding expected geometry of lane lines stored in a digital map of the world model. Additionally, the detection systems could detect the road signs 132a, 132b and the landmark 134 to compare such features with corresponding semantic features in the world model. The features may be stored as points (e.g., signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 150 interacts with the various features. Based on the comparison of the detected features with the features stored in the digital map(s) of the world model, the system may generate a confidence level, which may represent a confidence of the vehicle in its location with respect to the features on a digital map and hence, its actual location. Additionally, and as described in further detail herein, the system 150 may update the world model to correct any inaccuracies or errors detected from the perception data.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters to classify portions, features, or attributes of an image. The image classification function may be embodied by a software module that may be communicatively coupled to a repository of images or image data (e.g., visual data and/or point cloud data) which may be used to detect and classify objects, road features, and/or features in real time image data captured by, for example, the camera system 220 and/or the LiDAR system 222. In some embodiments, the image classification function may be configured to detect and classify features based on information received from only a portion of the multiple available sources. For example, in the case that the captured visual camera data includes images that may be blurred, the system 250 may identify objects based on data from one or more of the other systems (e.g., LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the truck 200 (e.g., lane lines). The computer vision function may use, for example, an object recognition algorithm, video tracing, one or more photogrammetric range imaging techniques (e.g., a structure from motion (SfM) algorithms), or other computer vision techniques. Objects or road features detected via the computer vision function may include, but are not limited to, road signs (e.g., speed limit signs, stop signs, yield signs, informational signs, traffic signals such as traffic lights, signs or signs that direct traffic such as right-only or no-right turn signs, etc.), obstacles, other vehicles, lane lines, lane widths, shoulder locations, shoulder width, or construction-related objects (e.g., cones, construction signs, construction-related obstacles, construction zones, etc.), among others.

The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size, etc.). The computer vision function may be embodied by a software module that may be communicatively coupled to a repository of images or image data (e.g., visual data and/or point cloud data), and may additionally implement the functionality of the image classification function.

Mapping/localization module 204 receives perception data that can be compared to one or more digital maps stored in the mapping/localization module 204 to determine where the truck 200 is in the world and/or or where the truck 200 is on the digital map(s), for example, when generating a world model for the environment surrounding the truck 200. In particular, the mapping/localization module 204 may receive perception data from the perception module 202 and/or from the various sensors sensing the environment surrounding the truck 200 and may correlate features of the sensed environment with details (e.g., digital representations of the features of the sensed environment) on the digital maps. The digital map may have various levels of detail and can be, for example, a raster map, a vector map, etc. The digital maps may be stored locally on the truck 200 and/or stored and accessed remotely. In at least one embodiment, the truck 200 deploys with sufficiently stored information in one or more digital map files to complete a mission without connecting to an external network during the mission.

A centralized mapping system may be accessible via network 260 for updating the digital map(s) of the mapping/localization module 204, which may be performed, for example, based on corrections to the world model generated according to the techniques described herein. The digital map may be built through repeated observations of the operating environment using the truck 200 and/or trucks or other vehicles with similar functionality. For instance, the truck 200, a specialized mapping vehicle, a standard autonomous vehicle, or another vehicle can run a route several times and collect the location of all targeted map features relative to the position of the vehicle conducting the map generation and correlation. These repeated observations can be averaged together in a known way to produce a highly accurate, high-fidelity digital map. This generated digital map can be provided to each vehicle (e.g., from the network 260 to the truck 200) before the vehicle departs on its mission so it can carry it on board and use it within its mapping/localization module 204. Hence, the truck 200 and other vehicles (e.g., a fleet of trucks similar to the truck 200) can generate, maintain (e.g., update), and use their own generated maps when conducting a mission. The locally stored map data may be accessed to generate world models as described herein, to which corrections and temporal data may be added.

The generated digital map may include an assigned confidence score assigned to all or some of the individual digital features representing a feature in the real world. The confidence score may be meant to express the level of confidence that the position of the element reflects the real-time position of that element in the current physical environment. Upon map creation, after appropriate verification of the map (e.g., running a similar route multiple times such that a given feature is detected, classified, and localized multiple times), the confidence score of each element will be very high, possibly the highest possible score within permissible bounds.

The vehicle control module 206 may control the behavior and maneuvers of the truck 200. For example, once the systems on the truck have determined its location with respect to map features (e.g., intersections, road signs, lane lines, etc.) of the world map, the truck 200 may use the vehicle control module 206 and its associated systems to plan and execute maneuvers and/or routes with respect to the features of the environment identified in the world map. The vehicle control module 206 may make decisions about how the truck 200 will move through the environment to get to its goal or destination as it completes its mission. The vehicle control module 206 may consume information from the perception module 202 and the maps/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems; for example, the vehicle control module 206 may control one or more of a vehicle steering system, a propulsion system, and/or a braking system. The propulsion system may be configured to provide powered motion for the truck and may include, for example, an engine/motor, an energy source, a transmission, and wheels/tires. The propulsion system may be coupled to and receive a signal from a throttle system, for example, which may be any combination of mechanisms configured to control the operating speed and acceleration of the engine/motor and, thus, the speed/acceleration of the truck. The steering system may be any combination of mechanisms configured to adjust the heading or direction of the truck. The brake system may be, for example, any combination of mechanisms configured to decelerate the truck (e.g., friction braking system, regenerative braking system, etc.). The vehicle control module 206 may be configured to avoid obstacles in the environment surrounding the truck and use one or more system inputs to identify, evaluate, and modify a vehicle trajectory. The vehicle control module 206 is depicted as a single module but can be any combination of software agents and/or hardware modules capable of generating vehicle control signals operative to monitor systems and controlling various vehicle actuators. The vehicle control module 206 may include a steering controller for vehicle lateral motion control and a propulsion and braking controller for vehicle longitudinal motion.

In disclosed embodiments of a system for generating and updating world models for autonomous vehicle navigation, the system 150, 250 collects perception data on objects corresponding to the road upon which the truck 200 is traveling, may be traveling in the future (e.g., another road in an intersection), or an adjacent road or lane to which the truck 200 is traveling. Such objects are sometimes referred to herein as target objects. Perception data may also be collected for various road features, including road features relating to the geometry of a road, a shoulder, or one or more lanes of the road, as well as road features indicating a type of road or a condition of a road upon which the truck 200 is traveling or may travel. Collected perception data on target objects may be used to detect one or more errors in the world model maintained by the components of the truck 200, as described herein, including semantic and geometric errors. Temporal features (described in further detail herein) may also be incorporated into the world model based on perception data, which may be utilized to navigate the truck 200 as described herein.

In an embodiment, road analysis module 230 executes an artificial intelligence model to predict one or more road features or one or more attributes of detected target objects. The artificial intelligence model may be configured to ingest data from at least one sensor of the autonomous vehicle and predict the attributes of the object. In an embodiment, the artificial intelligence module is configured to predict a plurality of predetermined attributes of each of a plurality of detected target objects relative to the autonomous vehicle. The predetermined attributes may include a relative velocity of the respective target object relative to the autonomous vehicle and an effective mass attribute of the respective target object. In an embodiment, the artificial intelligence model is a predictive machine learning model that may be continuously trained using updated data, e.g., relative velocity data, mass attribute data, target object classification data, and road feature data. In various embodiments, the artificial intelligence model may employ any class of algorithms that are used to understand relative factors contributing to an outcome, estimate unknown outcomes, discover trends, and/or make other estimations based on a data set of factors collected across prior trials. In an embodiment, the artificial intelligence model may refer to methods such as logistic regression, decision trees, neural networks, linear models, and/or Bayesian models.

FIG. 3 shows a road analysis module 300 of system 150, 250. The road condition analysis module 300 includes velocity estimator 310, effective mass estimator 320, object visual parameters component 330, target object classification component 340, and the world map generation module 350. These components of road analysis module 300 may be either or both software-based components and hardware-based components.

Velocity estimator 310 may determine the relative velocity of target objects relative to the ego vehicle. Effective mass estimator 320 may estimate effective mass of target objects, for example, based on object visual parameters signals from object visual parameters component 330 and object classification signals from target object classification component 340. Object visual parameters component 330 may determine visual parameters of a target object such as size, shape, visual cues, and other visual features in response to visual sensor signals and generate an object visual parameters signal. Target object classification component 340 may determine a classification of a target object using information contained within the object visual parameters signal, which may be correlated to various objects and generate an object classification signal. For instance, the target object classification component 340 can determine whether the target object is a plastic traffic cone or an animal.

Target objects may include moving objects, such as other vehicles, pedestrians, and cyclists in the proximal driving area. Target objects may include fixed objects such as obstacles; infrastructure objects such as rigid poles, guardrails, or other traffic barriers; and parked cars. Fixed objects, also herein referred to herein as static objects and non-moving objects, can be infrastructure objects as well as temporarily static objects such as parked cars. Systems and methods herein may aim to choose a collision path that may involve a nearby inanimate object. The systems and methods aim to avoid a vulnerable pedestrian, bicyclist, motorcycle, or other targets involving people or animate beings, and this avoidance is a priority over a collision with an inanimate object.

The target object classification component 340 can determine additional characteristics of the road, including but not limited to characteristics of signs (e.g., speed limit signs, stop signs, yield signs, informational signs, signs or signs that direct traffic such as right-only or no-right turn signs, etc.), traffic signals such as traffic lights, as well as geometric information relating to the road. The target object classification component 340 can execute artificial intelligence models, for example, which receive sensor data (e.g., perception data as described herein, pre-processed sensor data, etc.) as input and generate corresponding outputs relating to the characteristics of the road or target objects. For example, the artificial intelligence model(s) may generate lane width information, lane line location information, predicted geometries of lane lines, a number of lanes in a road, a location or presence of a shoulder of the road, or a road type (e.g., gravel, paved, grass, dirt/grass, etc.) or a roadway type (e.g., highway, city road, double-yellow road, etc.).

Externally facing sensors may provide system 150, 250 with data defining distances between the ego vehicle and target objects or road features in the vicinity of the ego vehicle and with data defining direction of target objects from the ego vehicle. Such distances can be defined as distances from sensors, or sensors can process the data to generate distances from the center of mass or other portion of the ego vehicle. The externally facing sensors may provide system 150, 250 with data relating to lanes of a multi-lane roadway upon which the ego vehicle is operating. The lane information can include indications of target objects (e.g., other vehicles, obstacles, etc.) within lanes, lane geometry (e.g., number of lanes, whether lanes are narrowing or ending, whether the roadway is expanding into additional lanes, etc.), or information relating to objects adjacent to the lanes of the roadway (e.g., an object or vehicle on the shoulder, on on-ramps or off-ramps, etc.). Such information can be utilized by the various components of the system 150, 250 to generate or update the world map as described herein.

In an embodiment, the system 150, 250 collects data relating to target objects or road features within a predetermined region of interest (ROI) in proximity to the ego vehicle. Objects within the ROI may satisfy predetermined criteria for distance from the ego vehicle. The ROI may be a region for which the world map is generated in updated, in some implementations. The ROI may be defined with reference to parameters of the vehicle control module 206 in planning and executing maneuvers and/or routes with respect to the features of the environment. In an embodiment, there may be more than one ROI in different states of the system 150, 250 in planning and executing maneuvers and/or routes with respect to the features of the environment, such as a narrower ROI and a broader ROI. For example, the ROI may incorporate data from a lane detection algorithm and may include locations within a lane. The ROI may include locations that may enter the ego vehicle's drive path in the event of crossing lanes, accessing a road junction, making swerve maneuvers, or other maneuvers or routes of the ego vehicle. For example, the ROI may include other lanes travelling in the same direction, lanes of opposing traffic, edges of a roadway, road junctions, and other road locations in collision proximity to the ego vehicle.

In an embodiment, the system 150, 250 can generate a high-definition (HD) map, at least portions of which may be incorporated into a world model used by the autonomous vehicle to navigate. The system 150, 250 may generate an HD map by utilizing various data sources and advanced algorithms. The data sources may include information from onboard sensors, such as cameras, LiDAR, and radar, as well as data from external sources, such as satellite imagery and information from other vehicles. The system 150, 250 may collect and process the data from these various sources to create a high-precision representation of the road network. The system 150, 250 may use computer vision techniques, such as structure from motion, to process the data from onboard sensors and create a 3D model of the environment. This model may then be combined with the data from external sources to create a comprehensive view of the road network.

The system 150, 250 may also apply advanced algorithms to the data, such as machine learning and probabilistic methods, to improve the detail of the road network map. The algorithms may identify features, such as lane markings, road signs, traffic lights, and other landmarks, and label them accordingly. The resulting map may then be stored in a format that can be easily accessed and used by the autonomous vehicle. The system 150, 250 may use real-time updates from the vehicle's onboard sensors to continuously update the HD map data of the world model as the vehicle moves, as described herein. This enables the vehicle to maintain an up-to-date representation of its surroundings in the world model and respond to changing conditions in real-time or near real-time.

The world map generation component 350 can generate a world model, which may include or be generated based on the HD map data, to allow for safe and efficient operation of autonomous vehicles. The world map generation component 350 may perform various functionality described in connection with FIGS. 4, 5, 6, and 7 to identify corrections to the world map based on perception data captured by the various sensors of the autonomous vehicle. The world model can provide a detailed, up-to-date representation of the road upon which the vehicle is traveling, which the vehicle can use to navigate and make real-time decisions. Using the methods and systems discussed herein, a processor of the autonomous vehicle may generate or access a world model, provide corrections, and incorporate temporal features into the world model using various data (e.g., from identified road signs, target objects, road features, or received from a server).

In some implementations, the world map generation component 350 can transmit updates to the world map (e.g., semantic or geometric corrections) to one or more external servers. The servers can utilize the corrections to update remotely stored maps, which may subsequently be transmitted to other autonomous vehicles to provide for efficient navigation of the areas to which corrections were applied. The world map generation component 350 can iteratively access, correct, and update the world model to include various static and temporal features, as described in connection with FIG. 4. In some implementations, one or more graphical representations of the world model may be presented to an operator of the autonomous vehicle (e.g., via a display device of the autonomous vehicle, etc.).

In an embodiment, the world model generation component 350 can access map data to generate the world model. As described herein, the map data may be HD map data, which can be generated based on sensor data from several autonomous or mapping vehicles that traverse a road. To generate the world model, the world model generation component 350 can access map data corresponding to a location (e.g., a GPS location, etc.) of the autonomous vehicle. Using the perception data captured by the various sensors described herein, the world model generation component 350 can identify semantic errors and geometric errors in the world model. The semantic or geometric errors, once identified, can be utilized to update the world model in real-time or near real-time, enabling autonomous navigation of the vehicle with up-to-date information regarding its surroundings.

Semantic errors may include but are not limited to an incorrect speed limit for a road, an incorrect or misidentified road type of a road, an incorrect or misidentified lane type of a road, an incorrect or misidentified number of lanes in the road, or an incorrect or misidentified road type of a road. Information such as speed limits, road types, lane types, or numbers of lanes for a portion of a road can be included in the world model and utilized by one or more components of the autonomous vehicle for navigation. The world model generation component 350 can identify a semantic error by comparing detected semantic attributes of the road upon which the vehicle is traveling to corresponding semantic attributes identified for that road in the world model. Upon detecting a mismatch, the world model generation component 350 can generate a correction, or modification, to the world model, which may be applied as a direct correction or modification to the world model data or may be provided to downstream processing components with the uncorrected world model, to be utilized when performing navigational or other autonomous tasks.

Similar techniques may be performed to detect geometric errors in the world model. Geometric errors may include but are not limited to errors in expected geometry of lane lines (e.g., lane line location, lane line width, lane line pattern, lane line shape/path), errors in expected geometry of a shoulder of the road (e.g., shoulder presence, shoulder location, shoulder width, whether the shoulder narrows/widens, etc.), errors in expected geometry of intersections (e.g., number of intersecting roads, geometry of pathways through the intersection, etc.) or errors in expected geometry the road (e.g., road width, road shape such as curves, straightaways, whether the road narrows/widens, etc.). The world model generation component 350 can identify a geometric error by comparing detected geometric attributes of the road upon which the vehicle is traveling to corresponding geometric attributes identified for that road in the world model.

As described in further detail in connection with FIG. 4, the world model generation component 350 can generate and include temporal features for certain locations of the road before or surrounding the vehicle into the world model. Temporal features can include but are not limited to temporary obstacles, traffic signal states (e.g., red light, green light, yellow) for one or more lanes of the road, road conditions (e.g., slippery, icy, dry, etc.), or mission control data (e.g., navigational objectives, mission-specific requirements such as speed, etc.). The temporal features may be added to the world model by the world model generation component 350 when those features are proximate to the vehicle, and removed from subsequent updates of the world model when those temporal features are no longer relevant to autonomous vehicle navigation. For example, once a vehicle has traversed an intersection with a traffic light, the state data of the traffic light (a temporal feature) may be removed from the world model by the world model generation component 350.

FIG. 4 is a data flow diagram showing processes for generating a world model 450 for navigating an autonomous vehicle, according to an embodiment. The operations described in connection with the data flow diagram of FIG. 4 may be performed by any component of the various autonomous vehicles described herein, including the system 150 of FIG. 1, the system 250 of FIG. 2, the road analysis module 300 of FIG. 3. The operations described in connection with the dataflow diagram of FIG. 4 may be performed continuously or periodically during operation of the autonomous vehicle, or in response to detecting changes in the position of the autonomous vehicle. Although certain operations may be shown or described as occurring sequentially, it will be appreciated that any of the operations described in connection with FIG. 4 may be performed in parallel, or with a combination of parallel and sequential processing. Further, certain operations may be omitted, additional operations may be performed, or operations may be performed in alternative orders, to achieve useful results.

As shown, the generating and updating a world model 450 includes both static processing operations 400 and temporal processing operations 402. Static processing operations 400 refer to processing operations that generate static features of the roadway (e.g., permanent or persistent features of the road, such as road type, number of lanes, etc.). The static processing operations 400 may be utilized to generate spatial portions of the world model 450, which may sometimes be referred to as a "spatial world model." The spatial world model may then be updated to include additional temporal features via the temporal processing operations 402. The temporal processing operations 402 may include generating additional temporal features such as temporary obstacles, traffic signal states for one or more lanes of the road, road conditions, or mission control data.

To generate the world model, which represents an environment surrounding the autonomous vehicle (e.g., the ROI as described herein), the static processing operations 400 include accessing the map data 405. The map data 405 may include pre-processed map data (e.g., HD map data), as described herein, which may be generated based on input from several autonomous, semiautonomous, mapping, or other vehicles that traversed the roadway. The map data 405 accessed may correspond to a detected location of the autonomous vehicle (e.g., GNSS coordinates, etc.). The map data 405 may be stored in a machine-readable format, such as a sparse vector representation. In some implementations, the map data 405 may include data from a previously generated world model, which may be updated according to the techniques described herein.

Once the map data 405 has been accessed, geometric corrections 410 can be determined for the map data 405 based on the map data 405 and based on perception data captured by the sensors of the autonomous vehicle. To determine predicted geometric features of the road, artificial intelligence models can be executed, as described in connection with the techniques of the method 600 of FIG. 6. The artificial intelligence models may generate any geometric values for any road feature described herein, including but not limited to lane width of one or more lanes, lane line locations, predicted geometries (e.g., presence, curvature, etc.) of lane lines, a number of lanes in a road, a location or presence of a shoulder of the road, or a grade of the road, among others. The artificial intelligence models may be trained using any suitable machine learning technique, including supervised learning (e.g., optimization of trainable parameters based on ground truth data), semi-supervised learning, or unsupervised learning, among others.

To detect a geometric error in the map data 405, the predicted geometries of one or more road features generated via the artificial intelligence models can be compared to the corresponding geometric features identified in the map data 405. A mismatch can be identified as a geometric error in the map data. In some implementations, a geometric error can be detected in the map data 405 upon determining that the predicted value and the value identified in the map data 405 differ by more than a predetermined threshold. The threshold may be set based on the type of geometric feature. If a geometric error has been detected, a corresponding geometric correction 410 can be generated. The geometric correction 410 can be a modification to the world model 450, for example, which may be generated by modifying the corresponding incorrect geometry identified in the data structures of the world model 450. In some implementations, the geometric correction 410 can be stored separate from and provided with the world model 450 and can be utilized by downstream components of the autonomous vehicle to perform navigational tasks, as described herein. Geometric corrections 410 can be generated for each geometric error identified in the map data 405.

Similar techniques may be performed to generate semantic corrections 415 for the map data 405. The semantic corrections 415 for the map data 405 can be generated based on the map data 405 and perception data captured by the sensors of the autonomous vehicle. The semantic corrections 415 can be generated to address semantic errors detected based on characteristics of the roadway. To detect semantic errors in the map data 405, techniques similar to those described in connection with the method 700 of FIG. 7 may be performed. For example, artificial intelligence models may be utilized to detect and classify semantic features of the road upon which the autonomous vehicle is traveling.

The semantic features generated by the artificial intelligence models include but are not limited to an incorrect speed limit for a road, an incorrect or misidentified road type of a road, an incorrect or misidentified lane type of a road, an incorrect or misidentified number of lanes in the road, or an incorrect or misidentified road type of a road. The artificial intelligence models utilized to generate or otherwise predict the semantic features of the road may be trained using any suitable machine learning technique, including supervised learning (e.g., optimization of trainable parameters based on ground truth data), semi-supervised learning, or unsupervised learning, among others. In some implementations, the artificial intelligence models executed by the components of the autonomous vehicle may be retrieved from one or more remote servers.

To detect a semantic error in the map data 405, the semantic features of the road detected from the sensor data captured by the sensors of the autonomous vehicle can be compared to corresponding expected semantic features identified in the retrieved map data 405. A mismatch between expected semantic features and the semantic features determined from the sensor data can be identified as a semantic error in the map data 405. If a semantic error has been detected, a corresponding semantic correction 415 can be generated. The semantic correction 415 can be a modification to the world model 450, for example, which may be generated by modifying the corresponding incorrect semantic data identified in the data structures of the world model 450. In some implementations, the semantic correction 415 can be stored separate from and provided with the world model 450 and can be utilized by downstream components of the autonomous vehicle to perform navigational tasks, as described herein. Geometric corrections 410 can be generated for each geometric error identified in the map data 405.

The non-map data 420 may also be detected from the sensor data and may be utilized to generate the world model 450. The non-map data 420 can include any type of semi-permanent obstacle or feature of the road that may be omitted from the road. One example of non-map data 420 may include indications of construction obstacles (e.g., work zones, cones, construction equipment, etc.) detected via the sensor data. Any other type of obstacle, object, or feature of the roadway that is separate from the geometric or semantic features of the road may be included in the non-map data 420. Obstacles indicated in the non-map data 420 may be detected by executing corresponding object detection and classification models or algorithms, as described herein (e.g., processing the perception data from the sensors of the autonomous vehicle). The non-mapped data 420 may be incorporated into the world map 450 as described herein, to enable the autonomous vehicle to navigate around or otherwise avoid any obstacles identified in the non-map data 420.

The scene generation module 425 can generate the static portions (the spatial world model) of the world model 450 (sometimes referred to herein as a "scene") using the map data 405 and any generated geometric corrections 410, semantic corrections 415, and non-mapped data 420, to generate a machine-readable static scene that describes the surroundings of the autonomous vehicle. The scene generation module 425 can generate the scene to include the retrieved map data 405 that corresponds to the area surrounding the autonomous vehicle, in addition to any detected geometric corrections. In some implementations, the map data 405 included in the scene can be modified by the scene generation module 425, such that the incorrect geometry of the map data 405 is replaced with the corrected geometry identified in the geometric corrections 410. In some implementations, the scene generation module 425 can include the geometric corrections 410 in addition to the incorrect map data, without necessarily modifying the underlying map data 405.

The scene generation module 425 can perform similar techniques to incorporate the semantic corrections 415 and the non-map data 420 into the generated scene of the world model 450. For example, the scene generation module 425 can modify the map data 405 (which may already be modified to include any geometric corrections) such that the incorrect semantic information in the map data 405 is replaced with the corrected semantic information identified in the semantic corrections 410. In some implementations, the scene generation module 425 can include the semantic corrections 415 in addition to the incorrect map data, without necessarily modifying the underlying map data 405. To include the non-map data 420 into the scene, the scene generation module 425 can provide identifiers of non-mapped obstacles or objects in the non-map data 420, in addition to various characteristics of the obstacles or objects, including location, size, type, or other relevant attributes.

Once the scene generation module 425 has generated the spatial world model of the world model 450, the temporal processing operations 402 can be performed to include identifiers of various temporal signals into the world model 450. The temporal signals may be any type of signal or data that represents elements that may change on short notice or in real-time, including traffic light states, road conditions, or mission control data. Aspects of the world model 450 representing the temporal signals may sometimes be referred to herein as the "temporal world model." Other vehicles on the road may be included in the temporal world model of the world model 450, including information relating to the detected location, type, and expected path of the detected vehicles.

The signal state generation component 430 can generate and include signal state information into the world model 450. The signal state information may include indications of a state of any detected traffic signals, which may include traffic lights, or other permanent or semi-permanent traffic signals detected from the sensor data. The signal state generation component 430 can execute one or more object detection models and/or classification models using the perception data described herein as input to identify any traffic signals in front of or otherwise proximate to the autonomous vehicle. In some implementations, the signal state generation component 430 can associate different traffic signals with different lanes in the static world model, to assist with downstream navigation tasks.

The road conditions generation component 435 can generate and include road condition data into the world model 450. The road condition information may be any type of information that indicates a temporary condition of the roadway. Temporary conditions may include weather conditions, hazards such as sand, water, or ice, or other types of road conditions that may be detected from the perception data. To detect the road conditions, various artificial intelligence models may be executed using the perception data as input. The artificial intelligence models may be trained using machine learning techniques, as described herein, to generate predictions of road conditions given certain input data. Training data utilized to train said artificial intelligence models may include training images, LiDAR scans, radar data that is associated with ground truth road condition data.

The road conditions generation component 435 can execute the models to identify any relevant conditions of the road upon which the vehicle is traveling, and include identifiers, locations (if relevant), and attributes of the road conditions into the world model 450. The location data may be relative location data (e.g., a relative distance or relative location from the autonomous vehicle). Examples of road conditions included in the world model 450 can include a detected wetness of the road; the presence, location, and size of pools of water on the road; detected snow accumulations on the road, detect snowbanks adjacent to the road or on the shoulder; and the presence, location, and size of potholes detected on the road.

The mission control generation component 435 may generate and include any relevant mission control data into the world map 450. The mission control data can include high-level route information about where the autonomous vehicle will drive to reach its destination. For example, the mission control data may include a route name, and may be received from one or more external computing systems (e.g., external servers, mission control systems, etc.). The mission control data may be included as part of the world model 450 to represent an expected path for the autonomous vehicle within the world model 450, which may be utilized by downstream components to navigate the autonomous vehicle to the destination of the respective route. Once the temporal processing operations 402 have been performed to generate the temporal world model of the world model 450, the world model 450 can be provided to other downstream components executed by the autonomous vehicle. In some implementations, the geometric corrections 410 and the semantic corrections 415 can be transmitted to one or more external servers, which can correct map data distributed to other autonomous vehicles based on the corrections.

FIG. 5 is a flow diagram of an example method 500 of generating and updating a world model for autonomous vehicle navigation, according to an embodiment. The steps of the method 500 of FIG. 5 may be executed, for example, by an autonomous vehicle system, including the system 150, 250, or the road analysis module 300, according to some embodiments. The method 500 shown in FIG. 5 comprises execution steps 510-550. However, it should be appreciated that other embodiments may comprise additional or alternative execution steps or may omit one or more steps altogether. It should also be appreciated that other embodiments may perform certain execution steps in a different order. Steps discussed herein may also be performed simultaneously or near-simultaneously with one another.

The method 500 of FIG. 5 is described as being performed by an autonomous vehicle system (e.g., the system 150, the system 250, the road analysis module 300, etc.). However, in some embodiments, one or more of the steps may be performed by different processor(s) or any other computing device. For instance, one or more of the steps may be performed via a cloud-based service or another processor in communication with the processor of the autonomous vehicle and/or its autonomy system. Although the steps are shown in FIG. 5 as having a particular order, it is intended that the steps may be performed in any order. It is also intended that some of these steps may be optional.

At step 510, the autonomous vehicle system (e.g., the system 150, 250, the road analysis module 300, etc.) of an autonomous vehicle (e.g., the truck 102, the truck 200, etc.) can receive sensor data from one or more sensors of the autonomous vehicle. The sensor data can be captured during operation of the autonomous vehicle. The sensors may include one or more LiDAR sensors, one or more radar sensors, one or more cameras (e.g., RGB cameras, infrared cameras, three-dimensional (3D) cameras, etc.), and/or one or more IMUs. The sensor data may be received in response to polling requests automatically transmitted to the sensors or may be captured and stored in one or more data structures. The sensor data may include image data, which may be captured by one or more cameras or sensors of the autonomous vehicle and stored in memory of the autonomous vehicle system for processing, in a non-limiting example. The image data may depict regions of interest in front of or surrounding the autonomous vehicle.

The sensor data may include IMU data, which may indicate an orientation, acceleration or velocity, or rotation of the autonomous vehicle during its operation. The sensor data may include global positioning system data, which may indicate absolute coordinates of the autonomous vehicle. The sensor data may include LiDAR data, which may include LiDAR point clouds (or LiDAR images) of the areas ahead of, to the side, and behind the autonomous vehicle. The sensor data of the autonomous vehicle can be stored in memory and utilized to generate and update a world model, as described herein. The various sensor data captured by the sensors of the autonomous vehicle can depict or otherwise indicate the presence of various objects, obstacles, road features, or other vehicles.

At step 520, the autonomous vehicle system can access a world model (e.g., the world model 450) generated based at least on map information (e.g., the map data 405) corresponding to a location of the operation of the autonomous vehicle. The world model may be previously generated by the autonomous vehicle system. The map information may include pre-processed map data (e.g., HD map data), as described herein, which may be generated based on input from several autonomous, semiautonomous, mapping, or other vehicles that traversed the roadway. The map information accessed may correspond to a detected location of the autonomous vehicle (e.g., GNSS coordinates, etc.). The map information may be stored in a machine-readable format, such as a sparse vector representation. In some implementations, the map information may include data from a previously generated world model, which may be updated according to the techniques described herein.

Accessing the world model may include accessing one or more data structures in memory of the autonomous vehicle system that store the world model. In some implementations, the map information representing map data that is proximate to the autonomous vehicle. For example, in some implementations the autonomous vehicle system can retrieve map information corresponding to the location (e.g., GPS coordinates) of the autonomous vehicle. The world model (or map information being utilized as an initial baseline world model) can be accessed to apply corrections, such as geometric and semantic corrections, as well as to incorporate various temporal data. In some implementations, accessing the world model may include accessing a previously generated world model, which may include features (e.g., temporal features, static features, or corrections) applied based on previous iterations of the method 500.

At step 530, the autonomous vehicle system can determine at least one semantic correction for the world model based on the sensor data. Determining at least one semantic correction can include processing the sensor data received in step 510 to identify one or more semantic features of the road upon which the autonomous vehicle is traveling. For example, image data captured by cameras may be provided as input to one or more artificial intelligence models that are trained to generate identifications of semantic features as output. The artificial intelligence models may be executed by the autonomous vehicle system to both detect and classify the semantic features of the road using the sensor data as input. The semantic features generated by the artificial intelligence models include but are not limited to a speed limit for a road, a road type of a road, a lane type of a road, or a number of lanes in the road, among others. The artificial intelligence models utilized to detect and classify the semantic features may be previously trained by one or more servers and provided to the autonomous vehicle system for use during operation of the autonomous vehicle.

For example, the autonomous vehicle system can execute artificial intelligence models that can detect and classify road signs depicted in images captured by cameras of the autonomous vehicle. The signs may include, but are not limited to, speed limit signs, stop signs, yield signs, informational signs, or signs that direct traffic such as right-only or no-right turn signs. In some implementations, the artificial intelligence models may generate an indication of an association with one or more lanes of the road upon which the autonomous vehicle is traveling, to associate a detected sign as corresponding to a respective lane. Classifying the road signs may include extracting attributes of the road signs. For example, if a detected road sign is classified as a speed limit sign for a particular lane, the speed limit indicated on the sign can be extracted and utilized as semantic data for the road.

Semantic corrections can be determined for one or more semantic errors detected in the world model accessed in step 520. To detect a semantic error in the accessed world model, the semantic features generated via the artificial intelligence models can be compared to corresponding expected semantic features identified in the accessed world model. For example, upon detecting a speed limit sign with a speed limit for a roadway, the autonomous vehicle system can retrieve the speed limit for the same roadway in the accessed world model. The speed limit retrieved from the world model is the expected semantic data because it is the expected value based on the pre-generated map information (e.g., the map data 405) used to generate the world model. Similar techniques can be performed for each semantic feature detected by the artificial intelligence models, which may include one or more of any of the semantic features described herein.

If a mismatch is detected between the expected semantic features extracted from the world model and the semantic features generated via the artificial intelligence models, a corresponding semantic correction (e.g., a semantic correction 415) can be generated. The semantic correction can be data that may be utilized to modify to the world model. In some implementations, the semantic correction can be stored separate from and provided with the world model to other processing components of the autonomous vehicle. For example, in such implementations, the world model may be unmodified, and the semantic correction generated by the autonomous vehicle system may be provided in one or more separate data structures. In some implementations, the artificial intelligence models may generate a confidence score that indicates a confidence that a detected semantic feature has been detected in the sensor data. In such implementations, the autonomous vehicle system may generate a semantic correction when a mismatch is detected between the expected semantic features extracted from the world model and the semantic features, if the confidence value for the semantic features satisfies a predetermined threshold.

At step 540, the autonomous vehicle system can determine at least one geometric correction for the world model based on the sensor data and the map information. In some implementations, the at least one geometric correction may include a change in lane geometry identified in the world model. As described in connection with step 530, the autonomous vehicle system can determine one or more geometric corrections by processing the sensor data received in step 510 to predict the geometry of one or more road features of the road upon which the autonomous vehicle is traveling.

Image data captured by cameras or LiDAR data captured by LiDAR systems of the autonomous vehicle may be provided as input to one or more artificial intelligence models that are trained to generate predicted geometries of the road features. The geometries of the road features predicted or otherwise generated by the artificial intelligence models include but are not limited to the geometry of lane lines (e.g., lane line location, lane line width, lane line pattern, lane line shape/path), the geometry of a shoulder of the road (e.g., shoulder presence, shoulder location, shoulder width, whether the shoulder narrows/widens, etc.), the geometry of intersections (e.g., number of intersecting roads, geometry of pathways through the intersection, etc.) or the geometry the road itself (e.g., road width, road shape such as curves, grade information, straightaways, whether the road narrows/widens, a grade of a road, an elevation of the road, or a surface type of the road etc.). The surface type of the road may include gravel, rock, paved, or other suitable classifications for a road surface. The artificial intelligence models utilized to detect and classify the semantic features may be previously trained by one or more servers and provided to the autonomous vehicle system for use during operation of the autonomous vehicle.

Geometric corrections can be determined for one or more geometric errors detected in the world model accessed in step 520. To detect a geometric error in the accessed world model, the geometries of the road features generated via the artificial intelligence models can be compared to corresponding expected geometries of corresponding road features identified in the accessed world model. Similar techniques can be performed for the geometry of each road feature detected by the artificial intelligence models, which may include one or more of any of the geometric features described herein. In some implementations, the autonomous vehicle system can detect a presence of a geometric error if a difference between an expected geometry for a road feature and the predicted geometry of the road feature generated by the artificial intelligence models satisfies a predetermined threshold. In some implementations, the artificial intelligence models may generate a confidence score that indicates a confidence that the generated geometry for a detected road is accurate. In such implementations, the autonomous vehicle system may generate a geometric correction for a road feature if the confidence value for the geometry of the road feature satisfies a predetermined confidence threshold.

If a mismatch (e.g., satisfying a threshold, etc.) is detected between the expected geometry of a road feature extracted from the world model and the geometry of one or more road features generated via the artificial intelligence models, the autonomous vehicle system can generate a corresponding geometric correction (e.g., a geometric correction 410). The geometric correction can be data that may be utilized to modify to the world model to replace the incorrect geometry with the correct geometry generated by the artificial intelligence models. In some implementations, the geometric correction can be stored separate from (e.g., in one or more separate data structures) and provided with the world model to other processing components of the autonomous vehicle. For example, in such implementations, the world model may be unmodified, and the geometric correction generated by the autonomous vehicle system may be provided in.

At step 550, the autonomous vehicle system can generate an updated world model based on the at least one semantic correction and the at least one geometric correction. Generating the updated world model can include modifying the world model or map information accessed in step 520 to replace the incorrect data with the corresponding semantic correction(s) and geometric correction(s). In some implementations, the corrections may be stored separately, and the world model may be updated to include associations (e.g., pointers, references, etc.) to the semantic corrections and geometric corrections. In some implementations, the autonomous vehicle system can include temporal features into the world model, as described herein. For example, the autonomous vehicle system can update the world model to include predictions of one or more road conditions detected via the sensor data (e.g., which may be generated by corresponding artificial intelligence models, as described herein). In some implementations, the autonomous vehicle system can update the world model to include the states of any detected dynamic traffic signals. For example, and as described in connection with FIG. 4, the autonomous vehicle system can execute one or more artificial intelligence models to classify the state of one or more traffic lights. The state of the traffic lights may be included as temporal data in the world model.

FIG. 6 is a flow diagram of an example method 600 of generating geometric corrections for a world model for autonomous vehicle navigation, according to an embodiment. The steps of the method 600 of FIG. 6 may be executed, for example, by an autonomous vehicle system, including the system 150, 250, or the road analysis module 300, according to some embodiments. The method 600 shown in FIG. 6 comprises execution steps 610-650. However, it should be appreciated that other embodiments may comprise additional or alternative execution steps or may omit one or more steps altogether. It should also be appreciated that other embodiments may perform certain execution steps in a different order. Steps discussed herein may also be performed simultaneously or near-simultaneously with one another.

The method 600 of FIG. 6 is described as being performed by an autonomous vehicle system (e.g., the system 150, the system 250, the road analysis module 300, etc.). However, in some embodiments, one or more of the steps may be performed by different processor(s) or any other computing device. For instance, one or more of the steps may be performed via a cloud-based service or another processor in communication with the processor of the autonomous vehicle and/or its autonomy system. Although the steps are shown in FIG. 6 as having a particular order, it is intended that the steps may be performed in any order. It is also intended that some of these steps may be optional.

At step 610, the autonomous vehicle system (e.g., the system 150, 250, the road analysis module 300, etc.) of an autonomous vehicle (e.g., the truck 102, the truck 200, etc.) can retrieve, from a world model, expected geometric data for a road traveled by an autonomous vehicle. The expected geometric data for the road may include a location of a shoulder of the road, a location of one or more lane lines of the road, a number of lanes of the road, a grade of the road, or lane line locations of the road, among other geometric data described herein. To retrieve the expected geometric data, the autonomous vehicle system can perform one or more operations described in connection with step 520 of the method 500 of FIG. 5. For example, the autonomous vehicle system can retrieve map data (e.g., the map data 405) from memory (e.g., from one or more data structures, from a previously generated world model, etc.) of the autonomous vehicle system, which can include indications of expected geometries of road features proximate to the autonomous vehicle, such as an expected geometry of a shoulder of the road (e.g., shoulder presence, shoulder location, shoulder width, whether the shoulder narrows/widens, etc.), an expected geometry of an intersection (e.g., number of intersecting roads, geometry of pathways through the intersection, etc.) or an expected geometry the road (e.g., road width, road shape such as curves, straightaways, whether the road narrows/widens, grade, etc.).

At step 620, the autonomous vehicle system can receive sensor data from one or more sensors of the autonomous vehicle. The sensor data can be captured as the autonomous vehicle is traveling on a road. As described herein, the various sensor data may include perception data, which can include camera images (e.g., RGB images, infrared images, 3D images etc.), LiDAR images, or radar data, among others, relating to a region of interest in front of and/or around the autonomous vehicle. To receive the sensor data, the autonomous vehicle system can perform operations similar to those described in connection with step 510 of the method 500 of FIG. 5. For example, the autonomous vehicle system can retrieve the sensor data using sensor data polling requests automatically transmitted to the sensors. In some implementations, the sensor data may be captured and stored in one or more data structures automatically by one or more sensors or other components of the sensor data may be received in response to polling requests automatically transmitted to the sensors or may be captured and stored in one or more data structures. The sensor data may include image data, which may be captured by one or more cameras or sensors of the autonomous vehicle and stored in memory of the autonomous vehicle system for processing, in a non-limiting example. The image data may depict regions of interest in front of or surrounding the autonomous vehicle. The sensor data may include image data, which may be captured by one or more cameras or sensors of the autonomous vehicle and stored in memory of the autonomous vehicle system for processing, in a non-limiting example. The image data may depict regions of interest in front of or surrounding the autonomous vehicle.

At step 630, the autonomous vehicle system can generate a predicted geometry for a feature of the road. To do so, the autonomous vehicle system may execute an artificial intelligence model using at least a portion of the sensor data as input to generate the predicted geometry for the feature of the road. For example, the autonomous vehicle system can provide image data captured by cameras, or LiDAR data captured by LiDAR systems, or combinations thereof, as input to one or more artificial intelligence models that are trained to generate predicted geometries of the road features. The road features may include, but are not limited to, a shoulder of the road, a lane of the road, an intersection of the road, or the road itself.

The artificial intelligence model(s) may be trained according to any suitable machine learning technique and may be trained via one or more servers or computing systems and provided to the autonomous vehicle system for use when the autonomous vehicle system is operating. The artificial intelligence model(s) may be trained to generate predicted geometries of one or more road features based on the input data. The artificial intelligence model(s) may include detection and classification models, such as models that can detect and classify types of road features depicted in the image data or LiDAR data captured by various sensors of the autonomous vehicle. In some implementations, the artificial intelligence models may include various regression models or other similar models that generate output predictions of various geometries of the road features.

The geometries of the road features predicted or otherwise generated by the artificial intelligence models may include, but are not limited to, the geometry of lane lines (e.g., lane line location, lane line width, lane line pattern, lane line shape/path), the geometry of a shoulder of the road (e.g., shoulder presence, shoulder location, shoulder width, whether the shoulder narrows/widens, etc.), the geometry of intersections (e.g., number of intersecting roads, geometry of pathways through the intersection, etc.) or the geometry the road itself (e.g., road width, road shape such as curves, grade information, straightaways, whether the road narrows/widens, a grade of a road, an elevation of the road, or a surface type of the road etc.). The surface type of the road may include gravel, rock, paved, or other suitable classifications for a road surface. The predicted geometries of the features of the road may be stored in association with the sensor data in the memory of the autonomous vehicle system. In some implementations, the artificial intelligence models may generate a confidence score that indicates a confidence that the generated geometry for a detected road feature is accurate. The confidence score may be stored in association with the respective predicted geometry in the memory of the autonomous vehicle system.

At step 640, the autonomous vehicle system can detect an error in the expected geometric data based on the predicted geometry of the feature. To do so, the autonomous vehicle system can compare the geometries of road features generated via the artificial intelligence models in step 630 to corresponding expected geometries of features retrieved in step 610. The autonomous vehicle system can repeat the comparison for each road feature detected in the sensor data, to identify which of the detected road features have incorrect geometries in the map data. In implementations where the artificial intelligence models generate a confidence score for each predicted geometry, the autonomous vehicle system can determine that a road feature has incorrect geometry when there is a mismatch between the predicted geometry and the expected geometry only when the confidence score satisfies a confidence threshold.

In some implementations, the autonomous vehicle system can detect a presence of a geometric error if a difference between an expected geometry for a road feature and the predicted geometry of the road feature generated by the artificial intelligence models satisfies a predetermined threshold. This can be utilized to prevent corrections that are minor deviations from an expected geometry and may improve computational performance by reducing the number of modifications to the world model, or by reducing the number of corrections generated for the world model. The indications of the geometric errors may be stored in association with the corresponding feature of the road identified in the world model or map data retrieved in step 610. In some implementations, the indications of the errors may be transmitted to one or more servers, which can subsequently correct map information based on the detected errors.

At step 650, the autonomous vehicle system can generate a correction to the world model based on the error. To do so, the autonomous vehicle system may update the world model retrieved in step 610 to generate an updated world model. For example, the autonomous vehicle system can modify the world model or map information accessed in step 610 to replace the incorrect geometric data of a road feature with the predicted geometry for the road feature generated by the artificial intelligence models. In some implementations, the predicted geometries for the road features may be stored in one or more data structures that are separate from the world model or map information. In such implementations, the world model may be updated to include associations (e.g., pointers, references, etc.) to the predicted geometries. Once the world model has been updated or otherwise associated with correct geometric data, the autonomous vehicle system can provide the world model to downstream components to navigate the autonomous vehicle according to the modified world model. The autonomous vehicle system may repeat the method 600 as the autonomous vehicle system captures additional sensor data and the autonomous vehicle travels along the road, such that an up-to-date world model with corrected geometries for road features are always available for down stream components in real-time or near real-time.

FIG. 7 is a flow diagram of an example method 700 of generating semantic corrections for a world model for autonomous vehicle navigation, according to an embodiment. The steps of the method 700 of FIG. 7 may be executed, for example, by an autonomous vehicle system, including the system 150, 250, or the road analysis module 300, according to some embodiments. The method 700 shown in FIG. 7 comprises execution steps 710-750. However, it should be appreciated that other embodiments may comprise additional or alternative execution steps or may omit one or more steps altogether. It should also be appreciated that other embodiments may perform certain execution steps in a different order. Steps discussed herein may also be performed simultaneously or near-simultaneously with one another.

The method 700 of FIG. 7 is described as being performed by an autonomous vehicle system (e.g., the system 150, the system 250, the road analysis module 300, etc.). However, in some embodiments, one or more of the steps may be performed by different processor(s) or any other computing device. For instance, one or more of the steps may be performed via a cloud-based service or another processor in communication with the processor of the autonomous vehicle and/or its autonomy system. Although the steps are shown in FIG. 7 as having a particular order, it is intended that the steps may be performed in any order. It is also intended that some of these steps may be optional.

At step 710, the autonomous vehicle system (e.g., the system 150, 250, the road analysis module 300, etc.) of an autonomous vehicle (e.g., the truck 102, the truck 200, etc.) can retrieve, from a world model, expected semantic data for a road traveled by an autonomous vehicle. The expected semantic data for the road may include a speed limit for the road, a lane type of a lane of the road, a presence of a road sign corresponding of the road, or a type of road sign corresponding to the road, among other geometric data described herein. To retrieve the expected semantic data, the autonomous vehicle system can perform one or more operations described in connection with step 520 of the method 500 of FIG. 5. For example, the autonomous vehicle system can retrieve map data (e.g., the map data 405) from memory (e.g., from one or more data structures, from a previously generated world model, the map data itself utilized as an initial world model, etc.) of the autonomous vehicle system, which can include indications of expected semantic data of the road upon which the autonomous vehicle is traveling. In some implementations, the map data may be retrieved from one or more servers in response to a request from the autonomous vehicle system.

At step 720, the autonomous vehicle system can receive sensor data from one or more sensors of the autonomous vehicle. The sensor data can be captured as the autonomous vehicle is traveling on a road. Receiving sensor data may include performing operations similar to those described in connection with step 620 of the method 600 of FIG. 6. As described herein, the various sensor data may include perception data, which can include camera images (e.g., RGB images, infrared images, 3D images etc.), LiDAR images, or radar data, among others, relating to a region of interest in front of and/or around the autonomous vehicle. The autonomous vehicle system can retrieve the sensor data using sensor data polling requests automatically transmitted to the sensors of the autonomous vehicle. In some implementations, the sensor data may be captured and stored in one or more data structures automatically by one or more sensors or other components of the sensor data may be received in response to requests automatically transmitted to the sensors or may be captured and stored in one or more data structures. The sensor data may depict various objects that indicate various semantic information about the road, such as speed limit, lane type, or traffic indications (e.g., stop, yield, etc.).

At step 730, the autonomous vehicle system can detect an error in the expected semantic data based on the sensor data. To detect an error in the expected semantic data, the autonomous vehicle system can process the sensor data received in step 720 to detect one or more objects (e.g., traffic signals, signs, road markings, etc.) that indicate semantic data relating to the road upon which the autonomous vehicle is traveling. Detecting the objects may include executing one or more object detection and/or classification models using the image data as input. For example, image data captured by sensors of the autonomous vehicle can be provided as input to one or more artificial intelligence models that are trained to generate identifications or classifications of objects representing semantic data detected in the sensor data as output.

In some implementations, once objects that indicate semantic data have been detected from the sensor data using one or more first artificial intelligence models, the autonomous vehicle system may execute one or more second artificial intelligence models that can classify or otherwise extract semantic data from the objects detected in the sensor data. The various artificial intelligence models may furhter generate a confidence value that is proportional to whether the output of the artificial intelligence models is expected to be accurate. For example, if an input image is blurry or challenging to classify, the artificial intelligence model may output a classification and a low confidence value. In contrast, if an input image clearly shows an object representing semantic data, the artificial intelligence model may output a classification and a high confidence value. The semantic features generated using the artificial intelligence models may include, but are not limited to, a speed limit for the road, a road type of the road, a lane type of the road (e.g., a left-only lane, a merging lane, etc.), or a number of lanes in the road, among others. The artificial intelligence models utilized to detect and classify the semantic features may be previously trained by one or more servers and provided to the autonomous vehicle system for use during operation of the autonomous vehicle.

To detect a semantic error in the accessed world model, the semantic data generated via the artificial intelligence models can be compared to corresponding expected semantic data identified in the accessed world model. For example, upon detecting a speed limit sign with a speed limit for a roadway, the autonomous vehicle system can retrieve the speed limit for the same roadway in the accessed world model. The speed limit retrieved from the world model is the expected semantic data because it is the expected value based on the pre-generated map information (e.g., the map data 405) used to generate the world model. Similar techniques can be performed for each semantic feature detected by the artificial intelligence models, which may include one or more of any of the semantic features described herein. In some implementations, an error may be detected in the semantic data if there is a mismatch between the semantic data extracted from the sensor data and the expected semantic data if the confidence value for that semantic data satisfies a predetermined threshold. This reduces the possibility of falsely identifying semantic errors based on misclassifications of sensor data.

At step 740, the autonomous vehicle system can generate a correction to the world model based on the error. If a semantic error is detected in the map information of the world model, a corresponding semantic correction (e.g., a semantic correction 415) can be generated. The semantic correction can be data that may be utilized to modify to the world model. In some implementations, the semantic correction can be stored separate from and provided with the world model to other processing components of the autonomous vehicle. For example, in such implementations, the world model may be unmodified, and the semantic correction generated by the autonomous vehicle system may be provided in one or more separate data structures. Corrections may include, but are not limited to, changes in speed limits for a road or a lane of a road, changes in a lane type of the road, changes in a road type of a road, changes in a traffic sign for a road (e.g., a stop sign has changed to a yield sign), an addition of a new traffic sign (e.g., a stop sign has been added to a road), a removal of a traffic sign (e.g., a yield sign has been removed), or changes in the number of lanes in the road, among others.

Once the world model has been updated or otherwise associated with corrected semantic data, the autonomous vehicle system can provide the world model to downstream components to navigate the autonomous vehicle according to the modified world model. The autonomous vehicle system may repeat the method 700 as the autonomous vehicle system captures additional sensor data and the autonomous vehicle travels along the road, such that an up-to-date world model with corrected semantic information for the road is always available for downstream components in real-time or near real-time. In some implementations, upon generating the correction to the semantic information, the indication of the error and the correction can be transmitted to one or more servers, which can subsequently correct corresponding map information based on the semantic error and provide updated map information to other autonomous vehicles.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system, comprising:
    at least one processor coupled to non-transitory memory, the at least one processor configured to:
        receive sensor data from a plurality of sensors of an autonomous vehicle, the sensor data captured during operation of the autonomous vehicle;
        detect temporal features based on the sensor data;
        access a world model generated based at least on map information corresponding to a location of the operation of the autonomous vehicle;
        determine at least one semantic correction for the world model based on the sensor data;
        determine at least one geometric correction for the world model based on the sensor data and the map information;
        generate an updated world model based on the at least one semantic correction and the at least one geometric correction; and
        incorporate the temporal features into the updated world model by:
            adding the temporal features to the updated world model when the temporal features are proximate to the autonomous vehicle; and
            removing the temporal features from the updated world model when the temporal features become irrelevant to the autonomous vehicle.

2. The system of claim 1, wherein the at least one processor is further configured to generate the updated world model further based on a road condition detected via the sensor data.

3. The system of claim 1, wherein the at least one processor is further configured to generate the updated world model further based on a state of a dynamic traffic signal detected via the sensor data.

4. The system of claim 1, wherein the at least one semantic correction comprises a change to signage identified in the world model.

5. The system of claim 1, wherein the at least one geometric correction comprises a change in lane geometry identified in the world model.

6. The system of claim 1, wherein the plurality of sensors comprises one or more of a light detection and ranging (LiDAR) sensor, a radar sensor, a camera, or an inertial measurement unit (IMU).

7. The system of claim 1, wherein the world model comprises road structure information identifying one or more of a grade of a road, an elevation of the road, or a surface type of the road.

8. The system of claim 1, wherein the world model comprises road marking information identifying one or more of a lane line location of a lane in a road, a lane type of the lane in the road, or a shoulder location of the road.

9. The system of claim 1, wherein the at least one processor is further configured to determine the at least one semantic correction based on a comparison between (i) an object detected from the sensor data and (ii) corresponding information in the world model.

10. The system of claim 1, wherein the at least one processor is further configured to determine the at least one geometric correction based on a comparison of a geometry of a road detected via the sensor data and a corresponding geometry of the road identified in the map information of the world model.

11. A method, comprising:
    receiving, by at least one processor coupled to non-transitory memory, sensor data from a plurality of sensors of an autonomous vehicle, the sensor data captured during operation of the autonomous vehicle;
    detecting, by the at least one processor, temporal features based on the sensor data;

accessing, by the at least one processor, a world model generated based at least on map information corresponding to a location of the operation of the autonomous vehicle;

determining, by the at least one processor, at least one semantic correction for the world model based on the sensor data;

determining, by the at least one processor, at least one geometric correction for the world model based on the sensor data and the map information;

generating, by the at least one processor, an updated world model based on the at least one semantic correction and the at least one geometric correction; and incorporating the temporal features into the updated world model by:

adding the temporal features to the updated world model when the temporal features are proximate to the autonomous vehicle; and removing the temporal features from the updated world model when the temporal features become irrelevant to the autonomous vehicle.

12. The method of claim 11, further comprising generating, by the at least one processor, the updated world model further based on a road condition detected via the sensor data.

13. The method of claim 11, further comprising generating, by the at least one processor, the updated world model further based on a state of a dynamic traffic signal detected via the sensor data.

14. The method of claim 11, wherein the at least one semantic correction comprises a change to signage identified in the world model.

15. The method of claim 11, wherein the at least one geometric correction comprises a change in lane geometry identified in the world model.

16. The method of claim 11, wherein the plurality of sensors comprises one or more of a light detection and ranging (LiDAR) sensor, a radar sensor, a camera, or an inertial measurement unit (IMU).

17. The method of claim 11, wherein the world model comprises road structure information identifying one or more of a grade of a road, an elevation of the road, or a surface type of the road.

18. The method of claim 11, wherein the world model comprises road marking information identifying one or more of a lane line location of a lane in a road, a lane type of the lane in the road, or a shoulder location of the road.

19. The method of claim 11, further comprising determining, by the at least one processor, the at least one semantic correction based on a comparison between (i) an object detected from the sensor data and (ii) corresponding information in the world model.

20. The method of claim 11, further comprising determining, by the at least one processor, the at least one geometric correction based on a comparison of a geometry of a road detected via the sensor data and a corresponding geometry of the road identified in the map information of the world model.

* * * * *